Oct. 22, 1963　　E. L. WALTERS ETAL　　3,107,457
APPARATUS FOR SURFACING GLASS
Filed Dec. 16, 1959　　14 Sheets-Sheet 2

INVENTORS
Emmett L. Walters,
Richard E. Warren,
BY Otto V. Young and
Martin Miklosek
Nobbe & Swope
ATTORNEYS

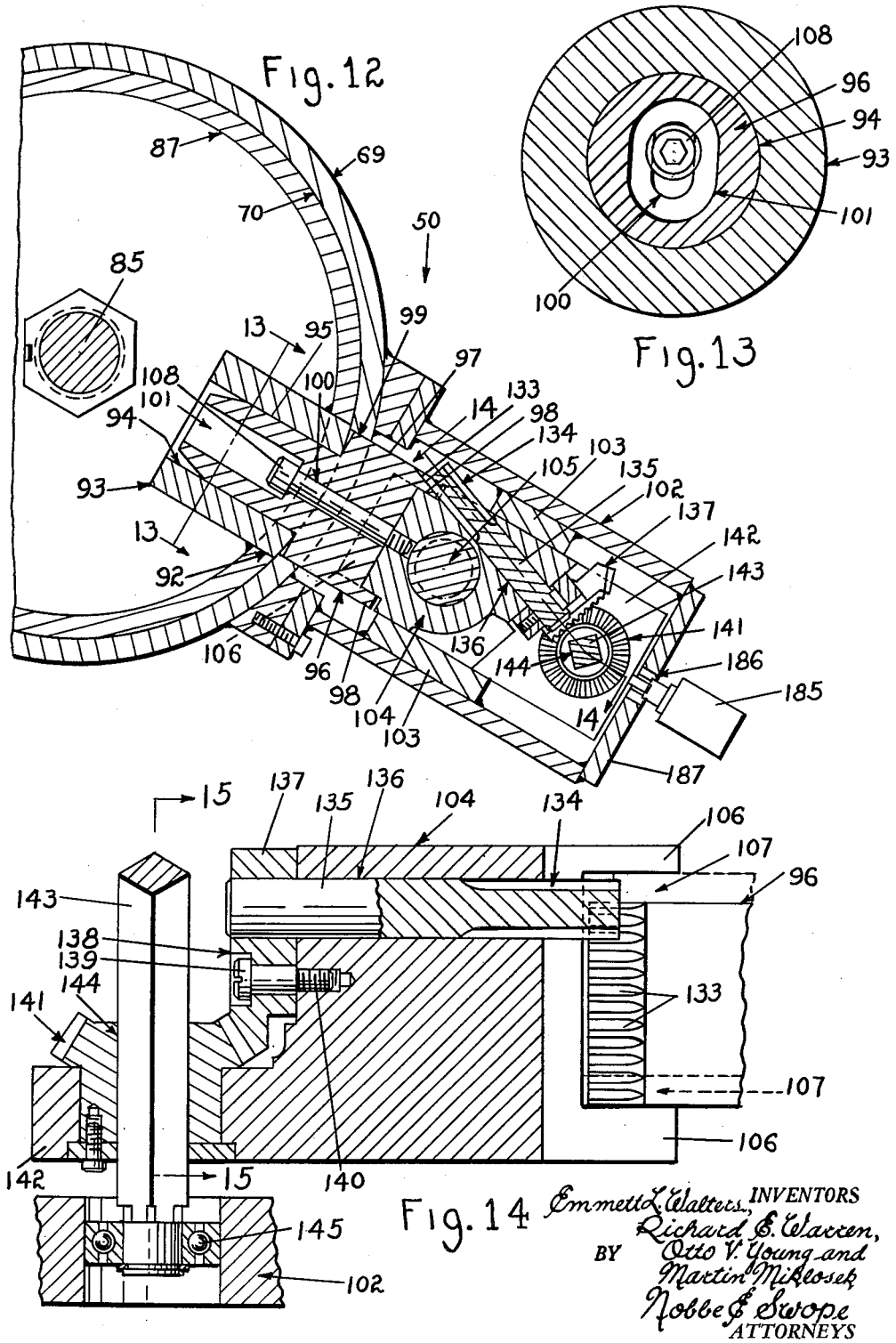

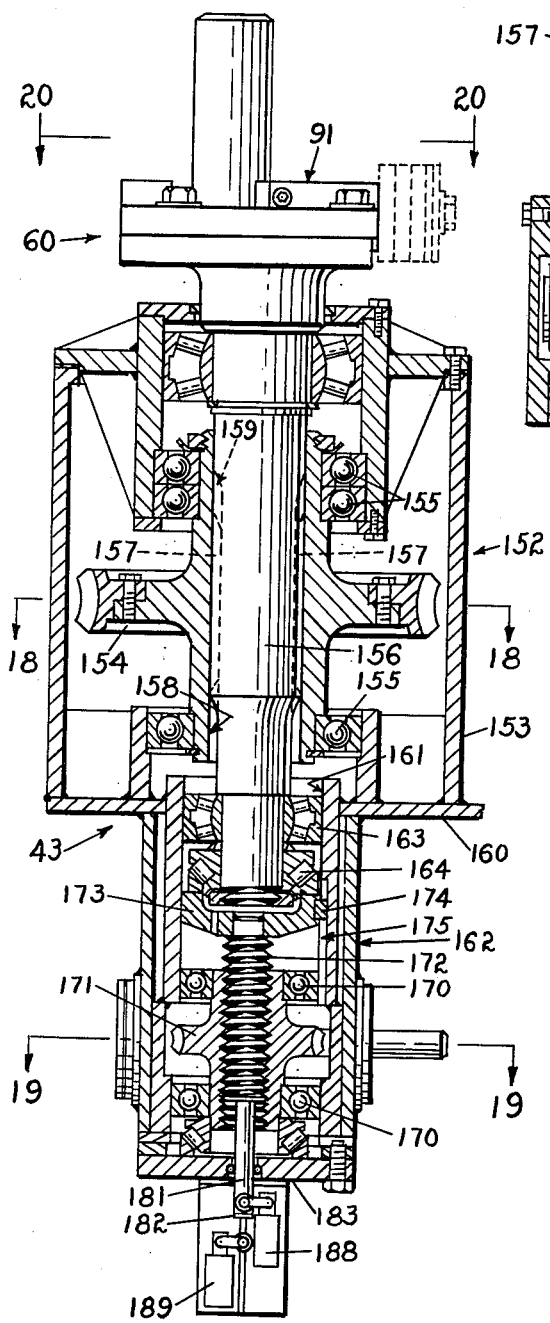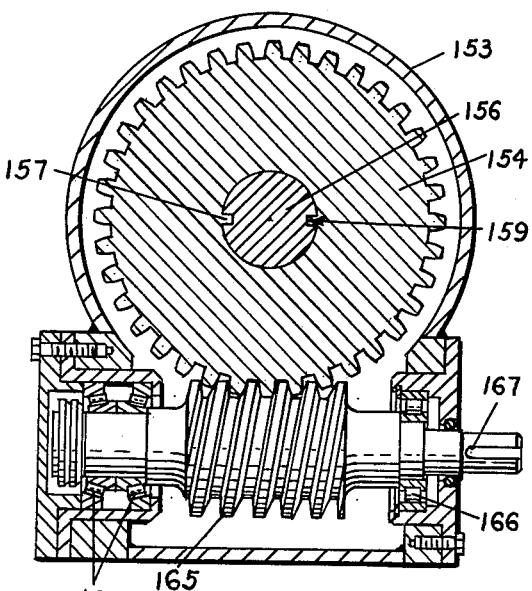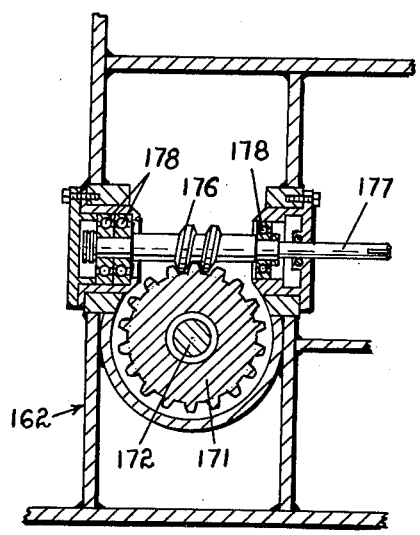

Oct. 22, 1963  E. L. WALTERS ETAL  3,107,457
APPARATUS FOR SURFACING GLASS
Filed Dec. 16, 1959  14 Sheets-Sheet 11

INVENTORS
Emmett L. Walters,
Richard E. Warren,
BY Otto V. Young and
Martin Miklosek
Nobbe & Swope
ATTORNEYS

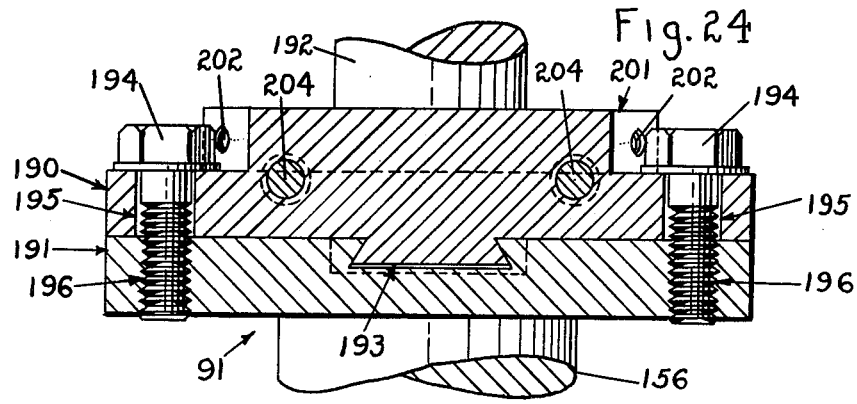
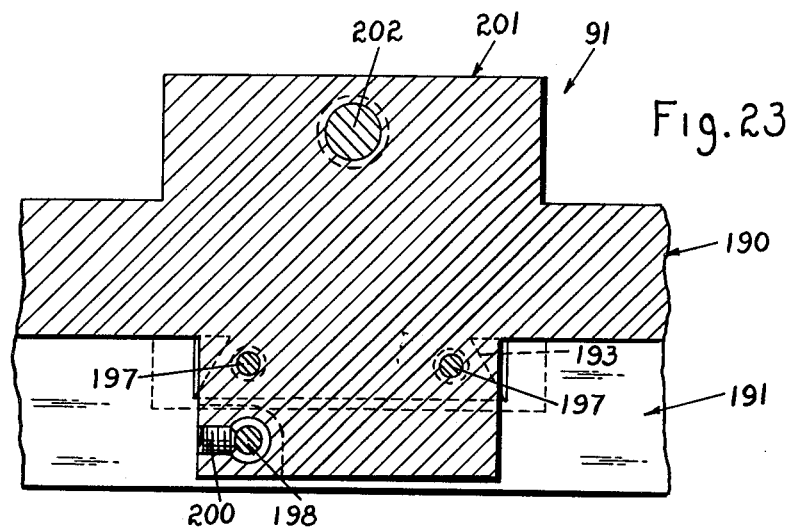
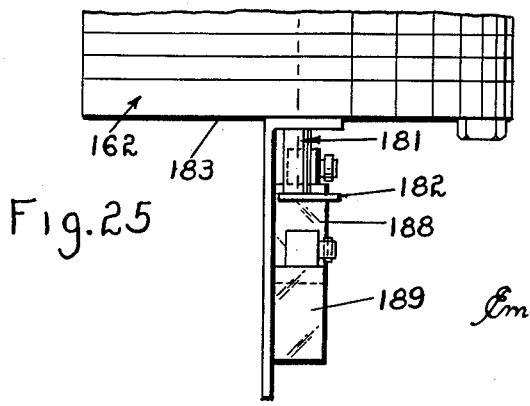

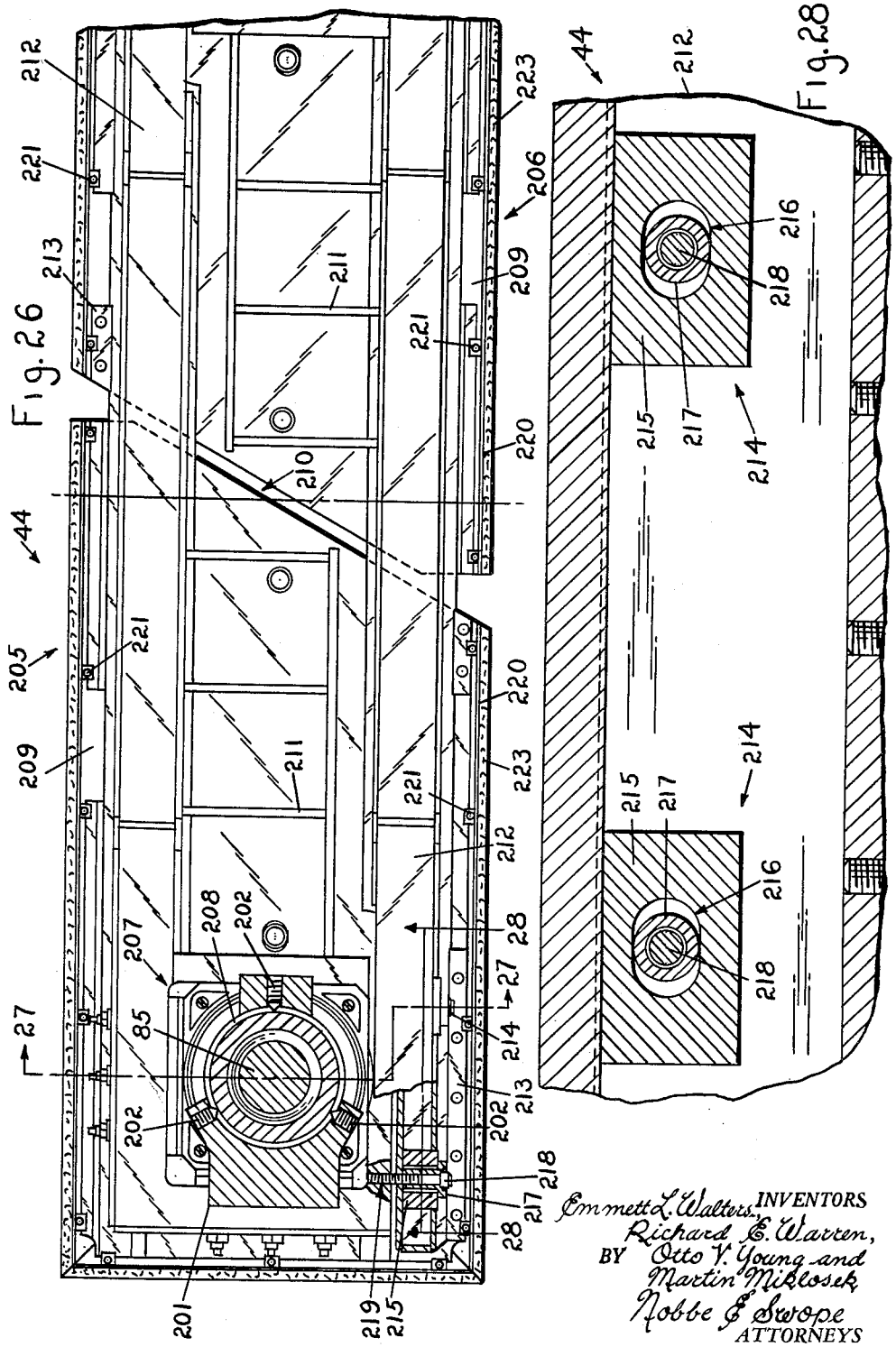

United States Patent Office 3,107,457
Patented Oct. 22, 1963

3,107,457
APPARATUS FOR SURFACING GLASS
Emmett L. Walters, Richard E. Warren, Otto V. Young, and Martin Miklosek, all of Toledo, Ohio, assignors to Libbey-Owens-Ford Glass Company, Toledo, Ohio, a corporation of Ohio
Filed Dec. 16, 1959, Ser. No. 859,919
18 Claims. (Cl. 51—112)

This invention broadly relates to the surfacing of glass and more particularly to an apparatus for simultaneously polishing both surfaces of a glass ribbon moving along a continuous path.

It has been long known that a glass ribbon may be ground on both sides, as for example according to the apparatus and process shown and described in U.S. Patent No. 2,176,481, issued to F. B. Waldron et al. on October 17, 1939. Circular rotating runners are normally employed rotating about a fixed axis, normally perpendicular to the glass, one runner being above and one runner being below the glass.

However, such a process for simultaneously grinding both surfaces of a glass ribbon has not proven to be entirely satisfactory. There is a tendency for the glass to break along the edges under the pressure of the rotating circular runners since they are unable to grind the glass uniformly across its width. This follows since these conventional circular runners perform less grinding action along the ribbon edges resulting in a somewhat uneven grinding pattern across the width of the ribbon. This uneven grinding pattern is of course, highly objectionable since in grinding a glass ribbon it is desirable to provide equal grinding action, or uniform grinding, on all points on the glass in order to both reduce the amount of grinding necessary to establish an absolutely flat surface and also to eliminate the possibility of developing excessive pressure at any point on the glass, which pressure would cause ribbon breakage.

Turning now to the present known polishing devices, it is also well known to polish both faces of a traveling strip of glass as shown and described in U.S. Patent No. 2,419,925, issued to F. B. Waldron et al. on April 29, 1947. In this concept the opposed surfaces are engaged by a plurality of circular polishing pads freely turnable about their individual axes, all being supported from a common frame that it itself rotated about an axis perpendicular to the plane of the glass.

In such polishing of both surfaces, one of the most important problems is the elimination of ribbon breakage as the ribbon passes through the space between the opposed surfacing tools. It has been found that glass polished according to the method and apparatus disclosed in the above-identified Waldron patent also has a tendency to break along its edges due to uneven pressure from the polishing pads and this is of course highly undesirable.

It has likewise been known, as shown and described in U.S. Patent No. 1,962,766, issued to J. P. Crowley et al. on June 12, 1934, and also as shown and described in U.S. Patent No. 1,962,767, issued to J. P. Crowley et al. on June 12, 1934, to surface (i.e. grind or polish) the opposed surfaces of a glass ribbon, moving along a definite path, by an oscillating motion of a surfacing unit which includes upper and lower rectangular surfacing runners. This oscillating or orbital motion is applied by rectangular runners whose major dimension is transverse of the path of travel of the glass. The two runners of each unit are further connected so that they will oscillate in unison.

While the apparatus and method shown, described and claimed in the above two Crowley et al. patents is satisfactory for certain purposes, the method and apparatus of the present invention has proven to be of particular utility and has supplied important advantages not available in the structure disclosed in those Crowley et al. patents. It should here be noted that the following description deals largely with the polishing of glass. This is believed to be desirable to facilitate understanding of the invention and is not intended as limiting the invention since it has equal application when simultaneously grinding opposed glass surfaces. The important advantages of the present apparatus, realized by using the method and apparatus of the present invention as compared to the method and apparatus disclosed in these Crowley et al. patents, will be later discussed. However, before proceeding with a detailed description of the method and apparatus of the present invention, it is felt that a preliminary discussion of some of the salient features thereof will facilitate a more complete understanding of these details later appearing.

Broadly stated, the present invention provides an apparatus to simultaneously surface both sides of a glass ribbon moving along a predetermined path by a new and unique control of and application of the surfacing forces.

Generally speaking it could be said that the efficiency of both grinding and polishing action on a glass surface is greater when each point on the glass has been subjected to a great number of surfacing actions exerted from all directions. However, it should be pointed out that this alone will not suffice to provide a mirror finish on the glass since the aforementioned principle is not the exclusive answer but forms only a part of the complete solution.

For example, it has been found that the lineal speed of the glass ribbon, as the glass is subjected to the working action of a rectangular surfacing tool moving along a path most aptly defined as a curvilinear translation, materially effects the glass finish. In the instant case this curvilinear translation is characterized by the fact that the path of each point on the tool describes a circle. It is contemplated, however, and should be understood that the broad concept of this invention would be applicable to other types of curvilinear translation for example, where the point on the tool followed an elliptical path.

Now, the examination of relative speeds includes a comparison of the speed and magnitude of the curvilinear translation either jointly or singly with this lineal glass path. By the term "magnitude" it is intended to mean the magnitude of the radius of the path on any point as it follows its certain path. In this regard it is noted that the glass ribbon is moved along a predetermined path under the action of suitable drive means that are themselves capable of delivering variable speeds. Therefore the lineal speed of the glass ribbon moving past a fixed point along the path of the ribbon may be varied between 0 inch per minute and 300 inches per minute. This, in and of itself, might not be considered singularly unique, however, when it is weighed and considered in the light of the further discussion it will become apparent that this variation in linear glass speed supplies an important control over an element or step of the present invention and assists in realizing the resultant superior mirror finish of the glass.

By suitable applicators, a glass surfacing or surface affecting medium is normally applied to both surfaces of the ribbon before or while the ribbon is surfaced. It has been found, however, that this medium should be applied uniformly across the ribbon, as for example, in a curtain. However, no matter what apparatus is used to apply the medium, care must be taken to be sure it is applied in a manner calculated to form a uniform film across all portions of the glass. This has been found to be highly pertinent to insure uniform surfacing of the glass. It is extremely important to insure uniformity of application of the surfacing medium so that when the medium is carried under or between the surfacing tools on the glass, there will not be developed any non-uniform areas of polishing medium to result in uneven glass surfacing.

Broadly expressed, control over the forces developed in the surfacing apparatus has been found to be a major factor establishing the superior mirror finish of glass surfaced according to the present method and apparatus. This is an extremely critical point of distinction, particularly with regard to the prior art typified by the aforementioned Crowley et al. patents, and therefore it is believed it would be desirable to more fully describe this concept of the invention at this point before proceeding with the detailed description.

Now as the glass ribbon passes between the opposed tools it has been found essential to eliminate all vibration transfer between the tools and the glass due to vibration of the tools or flutter of the tools. This is considered very important particularly as regarding breakage of the glass which would result if this vibration transfer became excessive or in fact if it was uncontrolled. This elimination of vibration transfer is also considered important from the standpoint of obtaining the superior mirror finish associated with glass surfaced according to the present invention. To accomplish this the individual surfacing tools of the present invention are balanced with respect to themselves and also with respect to each other so that the resultant forces acting on the glass are controlled and also undesirable forces acting on each surfacing tool or group of surfacing tools are minimized.

Another fact to be taken into consideration is the possible effect on the final glass surface of the wear of the runner surfacing face. In order to adequately control or alleviate this problem of runner wear, the control of the forces developed in the surfacing apparatus must include a fine adjustment or control since, for example, as the tools perform their normal function on the glass the surfacing faces of the tools naturally tend to wear, even if only slightly. However, if this wear were allowed to continue without compensation it could lead to inequalities of surfacing action. Therefore, in order to avoid resultant surface defects attributable to runner wear the surfacing face wear should be overcome. It should be understood that in continued use the surfacing face will have to periodically be replaced, however, in the interim period (i.e. while the runner performs its normal surfacing action) some compensation must be made to overcome the normal wear during use. In this regard it should be noted that normally the runners will wear evenly, however, in order to compensate for possible uneven wear of the runner working face, certain of the bearings in the runner supports have been made self-aligning.

In following further the novel concept of surfacing by the present invention, consider now the forces developed upon, or by, a single grinding runner or platen and its associated supports, there normally being two of the latter for each one of the former regardless of whether or not the runner be in the upper or lower position with respect to the glass being treated.

In the first instance, an examination of a single grinding platen positioned above the glass surface and in a position to surface the upper surface of the continuously moving glass ribbon will reveal the development of certain forces.

As the tool is caused to follow its path, best described as a curvilinear translation by reason of its speed of rotation and magnitude of oscillation, there is developed a force in the plane of the center of gravity of the tool which may be referred to as the centrifugal force of the tool. This force is the radial force of the tool exerted in a direction outwardly of the circular path of the tool.

Opposing this centrifugal force is a first bearing force developed in the two bearings. This first bearing force is exactly equal to but exerted in the opposite direction to the centrifugal force so that the resultant sum of these two forces is zero. The bearings are located in the plane of the center of gravity of the tool so that this first bearing force is located in the plane of the center of gravity of the tool, i.e. the plane of the centrifugal force.

The next force developed might be referred to as the drag force on the glass, so as to distinguish it from the polishing defect known as drag. This drag force is a tangential force exerted along a line tangent to the circular or orbital path described by the surfacing tool. This drag force is exerted in the plane of the glass surface contacted by the tool and is the force developed by the frictional resistance of the glass to the tool as the tool sweeps there across. The drag force, being tangential to the path of the tool is therefore 90° apart from the centrifugal force which as above discussed is a radial force when taken with respect to the path of the tool.

The remaining major force is a second bearing force developed in the same bearings that opposes the centrifugal force. This second bearing force is exactly equal to, but opposite to, the drag force so that the resultant sum of these two forces is actually zero. These bearings as above discussed, are located in the plane of the center of gravity of the tools, so that the first and second bearing forces are exerted in the same plane, i.e. the plane of the centrifugal force.

Now, although the two bearing forces are substantially in the same plane as the centrifugal force (i.e. the plane of the center of gravity of the tool) the drag force is in a different plane (i.e. the plane of the surface of the glass). This could possibly introduce some tendency of the surfacing tool to flutter as it followed its orbital path due to the torque thereby introduced. However, this tendency of the surfacing tool to flutter has been substantially eliminated or at least has been materially reduced by adding counterweights to dampen the effect of the centrifugal force. This dampening of the centrifugal force developed has been found to be extremely effective in overcoming any possible passage of flutter onto the drive mechanism or drive case. In addition, particular attention has been paid to the general machine design with emphasis on its rugged construction so as to further eliminate any possibility or tendency of any flutter developing.

The above features are applicable to both the upper and lower surfacing members and also to a surfacing unit, it being understood that a surfacing unit would be composed of two platens, one above and one below the glass, or four surfacing members, two above and two below the glass. It also should be understood that a plurality of these units, composed of two or four members, could be arranged along the path of the glass and that the above discussion would apply to each member of each unit regardless of the actual number.

In order to compensate for possible misalignment of the tools with respect to the glass because of an uneven or irregular surfacing face on the tools when the tools are arranged on opposite sides of the ribbon, the bearings for the upper tools are self-aligning as aforenoted. In the specific embodiment, to be later described in detail, the plane of action of the bearings is actually only 4 inches above the plane of the glass while the plane of the center of gravity of the tools is about ⅛ inch above this bearing plane. The bearings for the lower tools are not self-aligning and are fixed. They will of themselves, however, still overcome possible flutter so that the forces induced by the center of gravity and work effort taken with respect to a lower tool can be substantially disregarded, with respect thereto. However, counterweight are also used to dampen any possible forces acting on the driving case of the lower tool.

Now turning to the practical application of the present invention, for each individual member surfacing the upper surface of the ribbon there is a similar opposed lower member that is arranged to surface the lower surface of the ribbon. As will later be described the upper and lower tools are also positioned so that they move 180° out of phase with respect to each other. This means that the work effort or drag force applied by the upper runner or tool will always be applied in or exerted in a direction opposite to the drag force or work effort of the lower tool. This further establishes the equilibrium of the system and further avoids the possible introduction of any undesirable forces onto the glass.

Positive control over the amount of the work effort or drag force as well as control over the centrifugal force may be secured through the variation of any number of variables but primarily it is gained by altering the speed of spindle rotation or oscillation diameter. For example, it might be desirable, for some reason, to take action effecting the polishing defect known as drag by reducing or increasing the oscillating diameter. It might then, however, become desirable to make a converse alteration of the spindle speed to insure that the total power input to the glass remained the same. These conditions of course, are altered often and the optimum operating conditions will become apparent to the operator as he gains experience under varied conditions.

There has been discussed above the principal manner in which the present method and apparatus has established equilibrium of the apparatus and eliminated the flutter which is associated with conventional surfacing tools. This, of course, will be later explained and discussed in detail. In addition to this, and after establishment of the above described equilibrium, there has been added a system by which it is possible to add, and also to control, the positive working pressure of the surfacing tools, platens or runners on the glass. This gives a positive manner of insuring that only enough working pressure will be applied to the glass to result in the desired finish and that there will be no possibility of developing excessive pressures which might cause the ribbon to break.

There has, therefore, been provided a novel method of and apparatus for surfacing glass which has overcome the deficiencies of the prior art and resulted in an exacting quality finish upon both surfaces of the glass which surfaces are acted upon at the same time. Having broadly discussed the basic features of the applicants' polishing device it should be remembered that other salient and novel features will be hereinafter discussed which features individually effect one or more of the above principles.

As the specification proceeds it will be apparent that individual surfacing units of the present invention include two surfacing tools above the ribbon and two surfacing tools below the ribbon and that a plurality of these units are arranged in succession to provide continuous surfacing of a continuous ribbon. More particularly every individual surfacing tool will have its movement synchronized to either an adjacent or an alternate tool and likewise alternate or adjacent successive units are synchronized so as to establish an equilibrium condition among all the units and members of each unit. This concept of proper control over the forces acting on the glass and those developed within the units themselves lie at the very heart of this novel method and apparatus for surfacing glass and should be interpreted in the light of the description that follows.

Therefore, according to the present invention, there has been provided a method and apparatus for surfacing glass wherein the various contributing factors that influence the final finished surface on the glass have, to a great extent, all been considered and thereby a novel method and apparatus developed, to overcome the deficiencies, above discussed, of the prior art. The result is, therefore, a method and apparatus that will produce a mirror finish on both surfaces of the glass which is a finish of the highest quality.

It is therefore a primary object of the present invention to provide an improved apparatus for surfacing both sides of a continuous glass ribbon which will achieve an improved surface finish on the glass ribbon.

It is another object of the present invention to provide for control over all the forces applied to the glass surfaces in order to maintain these forces above and below the ribbon in a balanced condition.

It is yet another object of the present invention to provide safety controls to prevent damage to the apparatus when and if during the continuous surfacing operation, the glass ribbon should be broken.

It is yet a further object of the present invention to incorporate into the machine a number of checks and balances to counter the machine stresses that could possibly be transferred to the glass during surfacing and which might have a detrimental effect on the glass finish.

It is still yet another object of the present invention to provide an apparatus which incorporates all of the above features and which is rugged, extremely stable, efficient and relatively easy to maintain against all the disturbing factors that normally tend to adversely effect the glass finish achieved by apparatus that simultaneously surfaces both sides of a continuous glass ribbon.

Other objects and advantages of the invention will become more apparent during the course of the following description when taken in connection with the accompanying drawings.

In the drawings, wherein like numerals are employed to designate like parts throughout the same:

FIG. 12 is a section taken on the line 12—12 of FIG. 10 showing the relation of the glass breakage safety stop and the clearance indicator take-off;

FIG. 13 is a cross-section of a portion of the safety stop taken on the line 13—13 of FIG. 12;

FIG. 14 is a section of a portion of the safety stop and clearance indicating mechanisms taken on the line 14—14 of FIG. 12;

FIG. 15 is a fragmentary section of the clearance indicating mechanism taken on the line 15—15 of FIG. 14;

FIG. 17 is a vertical section of a lower head showing the platen drive and elevator mechanisms;

FIG. 18 is a cross-section taken on the line 18—18 of FIG. 17;

FIG. 19 is a cross-section taken on the line 19—19 of FIG. 17;

Figure 8:
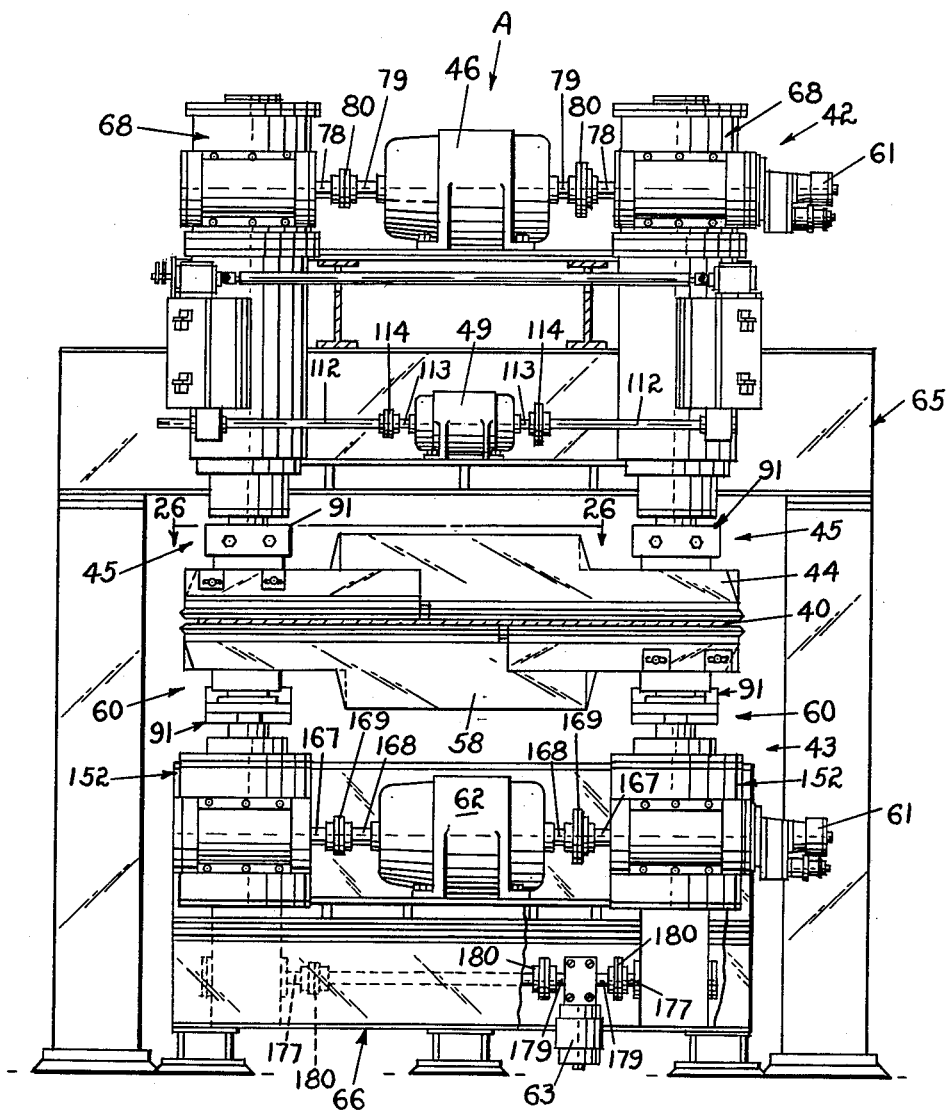
FIG. 8 is a cross-section taken on the line 8—8 of FIG. 6.
Figure 20:
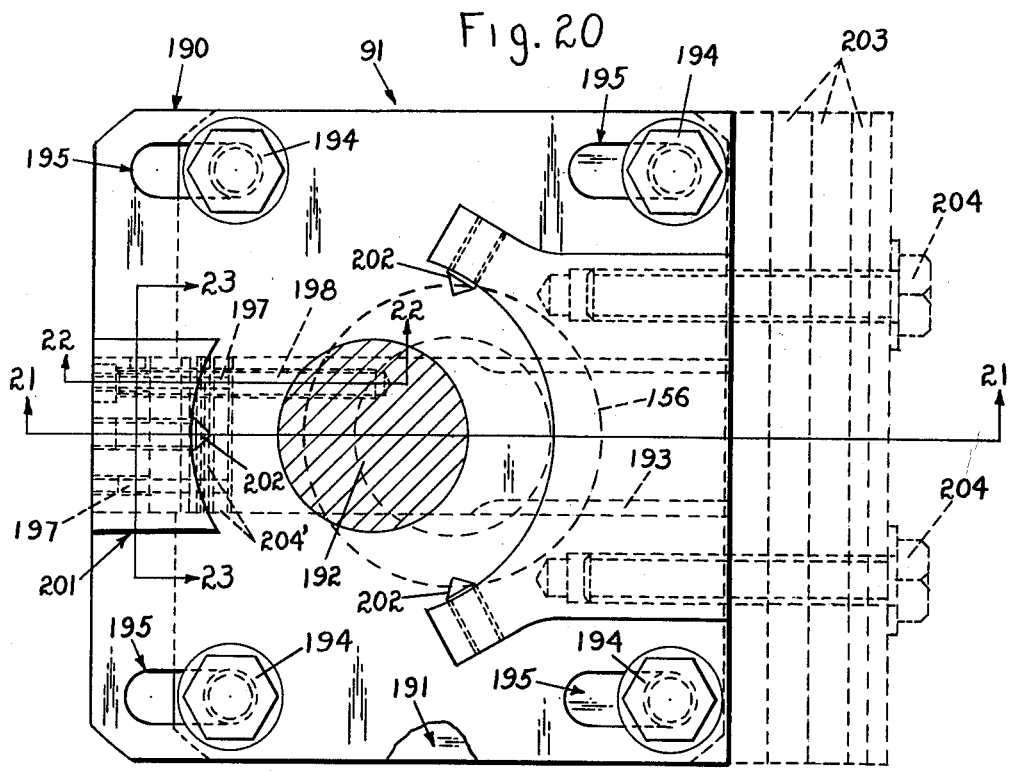
FIG. 20 is a cross-section taken on the line 20—20 of FIG. 17 showing the detailed construction of an eccentric.
Figure 21:
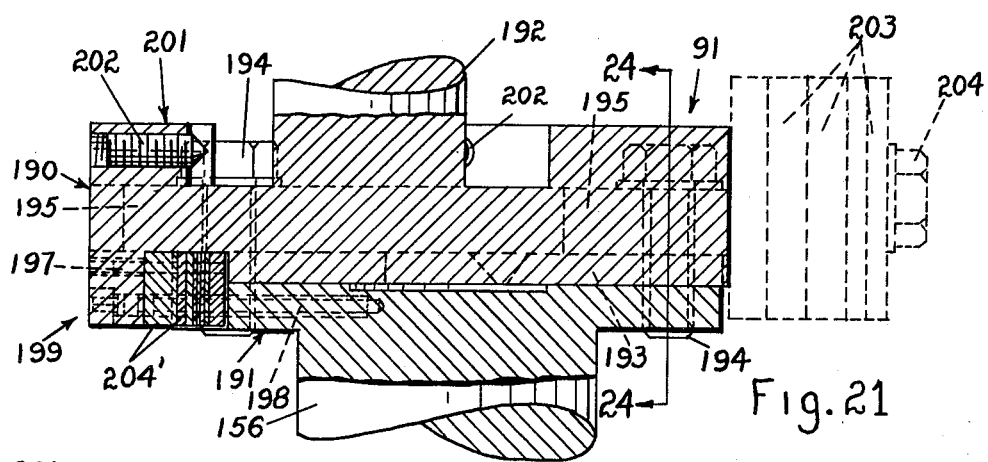
Figure 22:
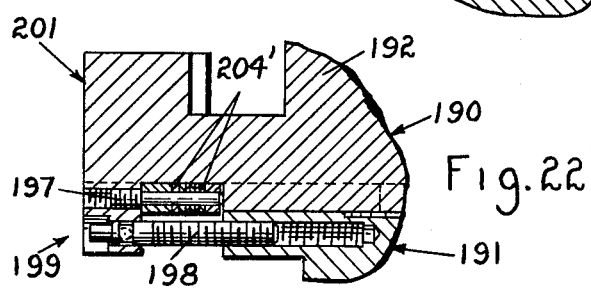
Figure 27:
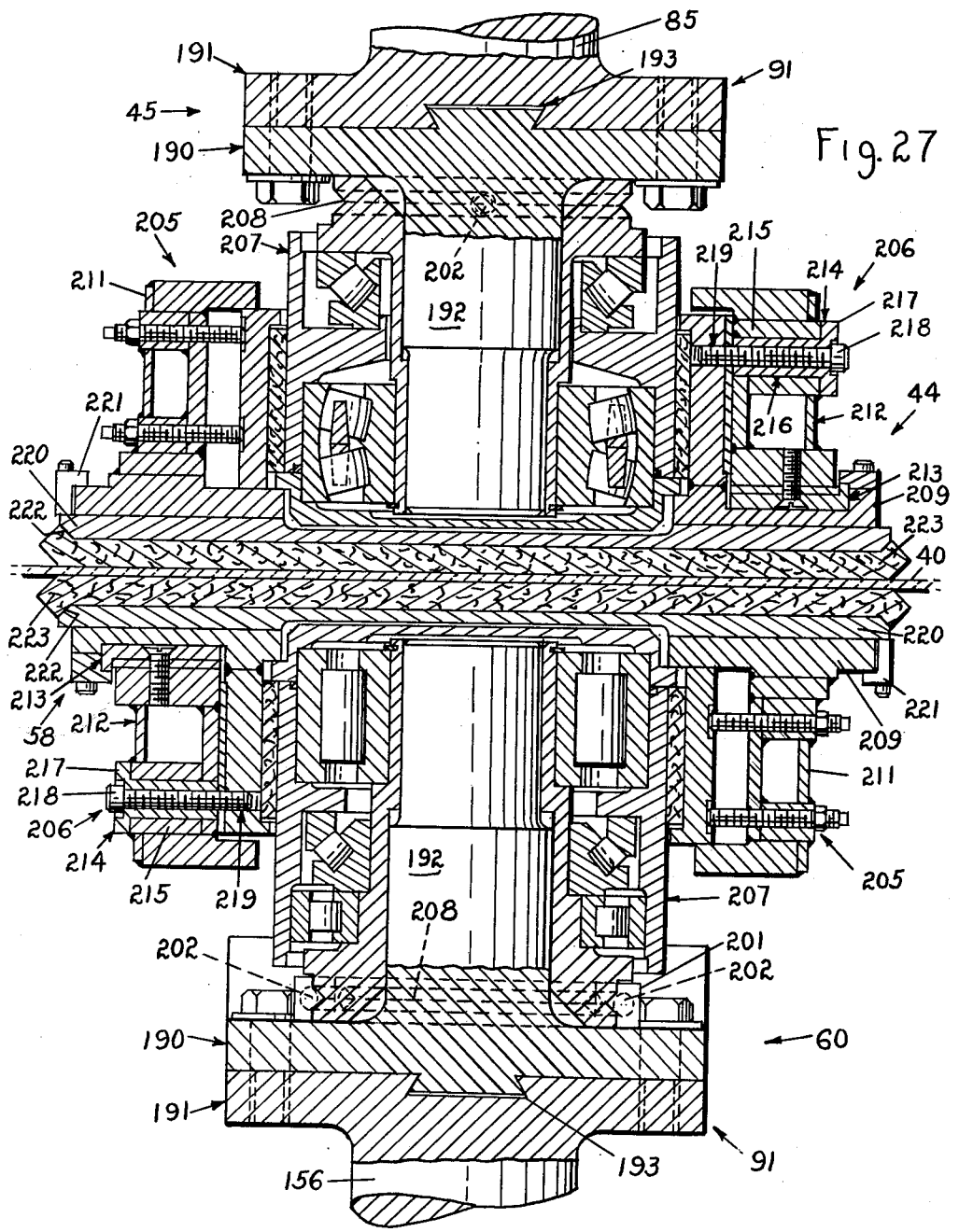

FIG. 21 is a section of an eccentric taken on the line 21—21 of FIG. 20;

FIG. 22 is a section of an eccentric taken on the line 22—22 of FIG. 20;

FIG. 23 is a section of an eccentric taken on the line 23—23 of FIG. 20;

FIG. 24 is a section of an eccentric taken on the line 24—24 of FIG. 21;

FIG. 25 is an enlarged detail of the switch apparatus for limiting the raising and lowering of a lower platen head;

FIG. 26 is a section taken on the line 26—26 of FIG. 8 showing a plan view of the divided platen;

FIG. 27 is a vertical section taken on the line 27—27 of FIG. 26 showing an upper and a lower polishing platen contacting opposite surfaces of the glass and respectively joined to an eccentric drive member; and FIG. 28 is a section of a portion of the platen taken on the line 28—28 of FIG. 26.

General Description

Preliminary to a complete description of the apparatus, reference is made to the schematic diagrams, FIGS. 1 through 5.

A ribbon of glass 40 is continuously advanced at one of a comparatively width range of speeds in the direction of the arrow 41 through a plurality of polishing stations, two of which are indicated by the letters "A" and "B." Each station is comprised of apparatus 42 for polishing the upper surface of the glass and apparatus 43 for polishing the lower surface of the glass.

Figure 1:
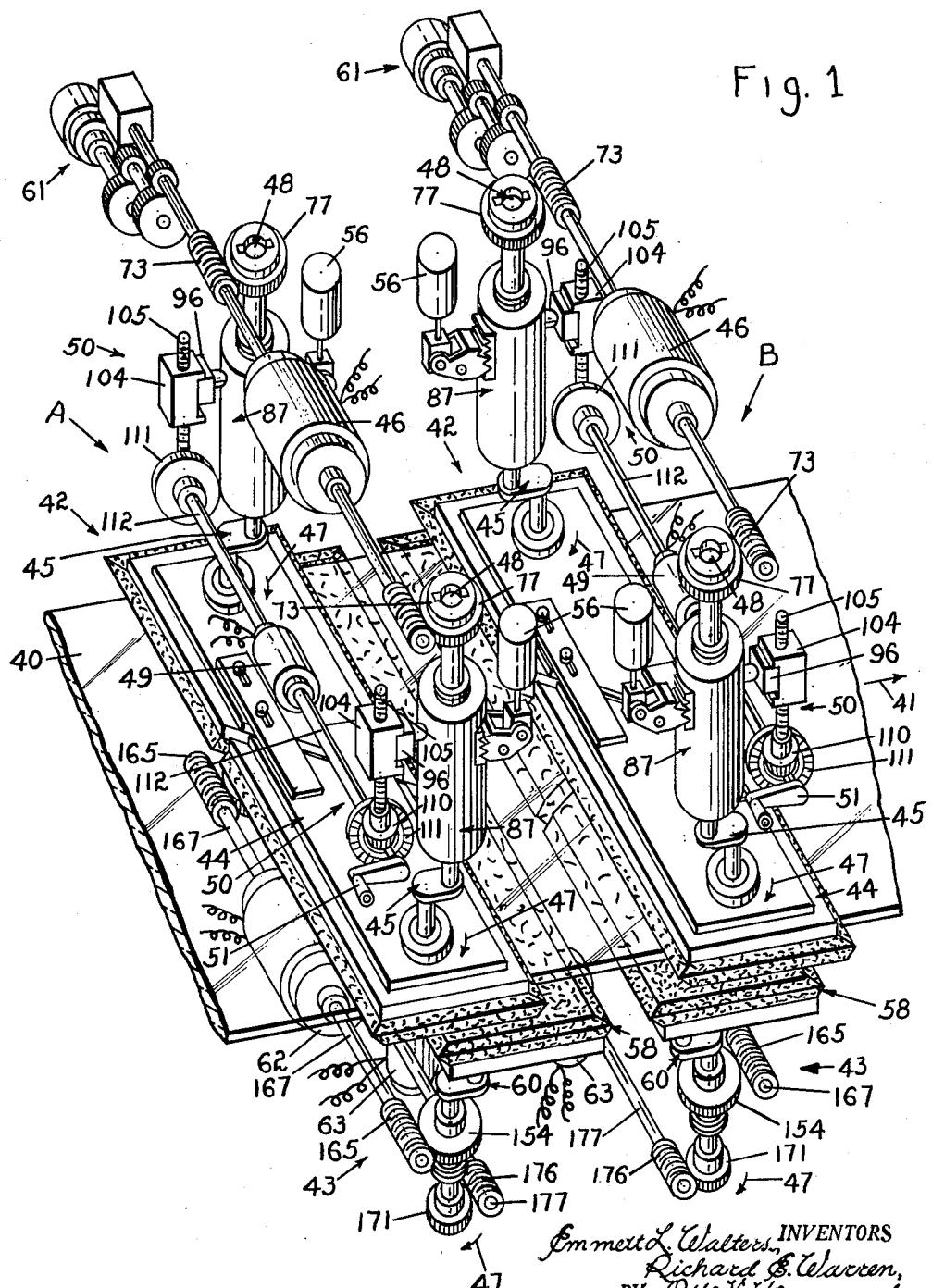
FIG. 1 is a schematic drawing of twin station apparatus for simultaneously polishing both surfaces of an advancing ribbon of glass.

The upper surface polishing apparatus 42 includes a rectangular polishing platen 44, including a felt working face, secured adjacent each end to an eccentric drive mechanism 45 driven by a variable speed motor 46 which imparts to the platen a curvilinear translation, or a circular orbital motion along a closed path, preferably in a clockwise direction as indicated by the arrow 47 in FIG. 1. Also, as shown in FIG. 1, the two eccentric drive mechanisms 45 for each platen 44 are in angular alignment so that the ends of the platens 44 remain parallel to the edges of the glass ribbon 40 at all times.

Figures 4, 5:
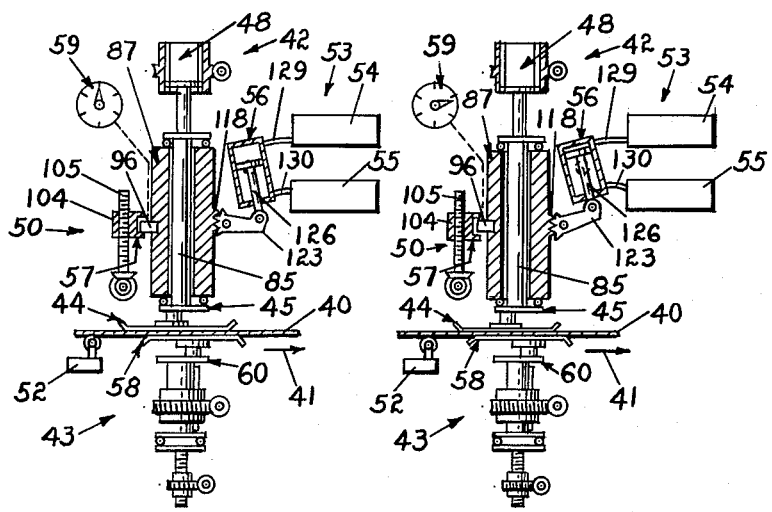

In FIGS. 2 through 5, the upper platen 44 is raised or lowered with respect to the ribbon of glass by telescoping a part of the eccentric drive mechanism 45, as generally indicated by the numeral 48. Lowering of the upper platen from the FIG. 2 to the FIG. 3 position is accomplished by motor 49 while further lowering from the FIG. 3 position to the glass contacting position of FIG. 4 is done manually by rotating a crank 51. Raising of the upper platen 44 is in response to a glass ribbon breakage detection device such as a switch 52 or to a manually operated switch (not shown) wired in parallel to the switch 52. The motor 49 is reversible and designed to lower the platen 44 at a low rate and to raise the platen at a fast rate.

Pneumatic operated apparatus 53 is mechanically connected to balance the weight of the upper platen 44 and those portions of the eccentric drive mechanisms 45 which are not supported by the framework and to apply a metered polishing pressure within a range of 0 to 4 p.s.i. upon the top surface of the glass. This value represents the contact pressure developed between the surfacing tools and the ribbon surfaces opposite thereto. The pneumatic control apparatus for balancing the weight of the upper platen and drive mechanism and applying pressure to the top surface of the glass ribbon 40, are respectively indicated by the numerals 54 and 55 and respectively are in communication with the top and the bottom of a cylinder 56. Upon breakage of the ribbon of glass 40, the switch 52 acts to relieve the pressure within the cylinder 56 simultaneously with the previously mentioned energization of the motor 49 for rapidly elevating the platen.

Realizing that a slight time lag will occur between the breaking of the ribbon of glass 40 and the raising of the upper platen 44, during which time the platen will drop, a mechanical safety stop 57 is incorporated into the upper platen elevating mechanism 50. The safety stop 57 will arrest the descent of the upper platen 44 upon breakage of the ribbon 40 before contact is made with the lower platen 58. An indicator 59 is calibrated in thousandths of an inch to permit the operator to adjust the safety stop apparatus 57 so that it will halt the descent of the upper platen 44 before it contacts the lower platen 58.

The lower glass surface polishing apparatus 43 is simpler than the upper glass surface polishing apparatus 42. The lower platen 58 is substantially identical with the upper platen 44, the only changes being those normally employed to compensate for the respective forces applied thereto. An eccentric drive mechanism 60 is connected to each end of the lower platen 58 to cause the lower platen to move according to a curvilinear translation equal in magnitude to the motion of the opposed upper platen 44, but 180° out of phase with the orbit of the upper platen. A selsyn system, generally indicated by the numeral 61, is provided to synchronize the orbital motions of the upper and lower platens, comprising each station, 180° out of phase relation.

The eccentric drive apparatus 60 for the lower surface polishing apparatus 43 is connected to a variable speed drive motor 62 and also to a reversible motor 63 for raising and lowering the lower platen 58. A bench mark is provided at each station to assist the operator in determining the initial level for each lower platen 58 and also serves as an indicator for determining when correction of the elevation of the platen 58 is required to compensate for wear of the platen polishing pad.

Figure 6:
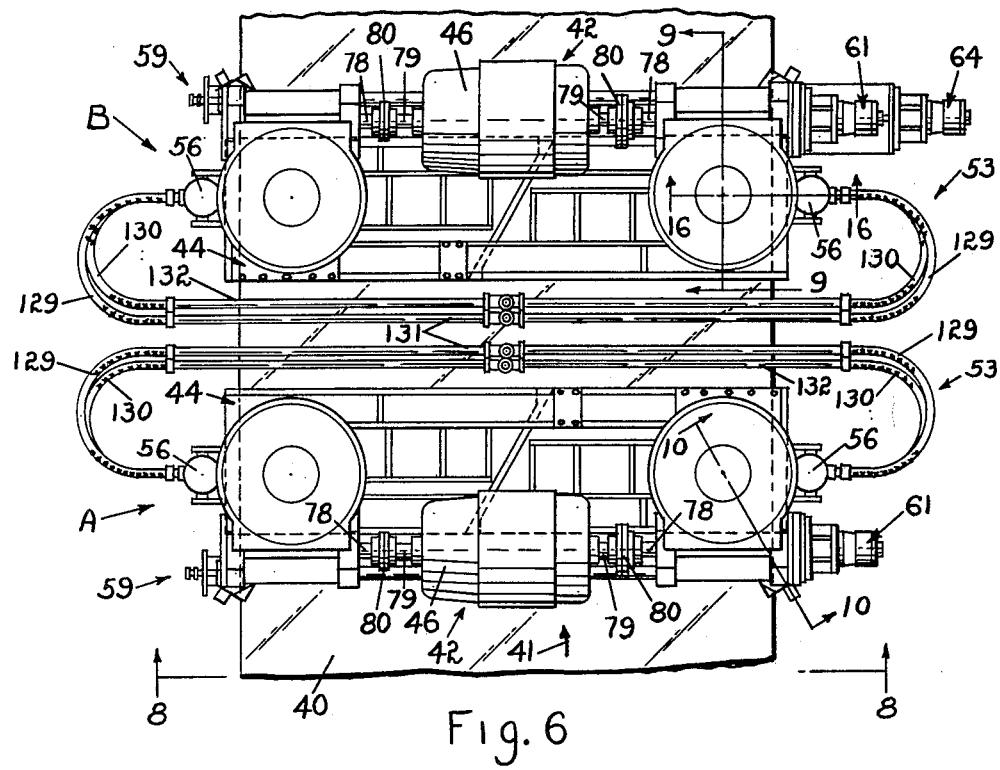
FIG. 6 is a plan view of the apparatus.

As is indicated in FIG. 6, a second selsyn system 64 is provided to synchronize the rate of the polishing platen at adjacent stations. As previously disclosed, the upper and lower platens 44 and 58 at any one station are each caused to move in a clockwise circular orbit of equal magnitude and at a synchronized speed, 180° out of phase. When the eccentric drives of adjacent stations, as "A" and "B," are synchronized by the second selsyn system 64, the motion of the upper platens 44 at adjacent stations and the lower platens 58 at adjacent stations (i.e. each unit composed of two upper and lower platens) are also operating 180° out of phase, as is shown in FIG. 1, and this relationship will remain as long as the platen speeds at adjacent stations are synchronized.

In other words, the upper platen 44 of any station "A" is moving in phased relation to the lower platen 58 of an adjacent station "B," when those two stations "A" and "B" are synchronized by the selsyn system 64. However it is also noted that the upper platens 44 of adjacent stations "A" and "B" are out of phased relation 180° with respect to each other.

Now due to the varying characteristics of the surfacing medium feeding of these upper platens (i.e. those factors which would include quantity, density or composition) the feed has been found to be somewhat less than continuously uniform over an extended period of time. In order to overcome the undesirable effects of these variables upon the glass finish, it has been found that the offset of the upper platens and also the offset of the lower platens (i.e. their different phased relation), is an important element achieving uniform glass finish. This is true since it has been found that by offsetting the upper platens (and also incidentally the offsetting of the lower platens), that this offset will balance or overcome the undesirable forces acting to the ribbon attributable to incidental feed variations. Thus the platen offset will keep any extraneous motion of the ribbon within operational requirements.

An initial examination of the polishing system shows that there are four variables present effecting the efficiency of the polishing operation. These variables are broadly expressed as follows:

(1) The frequency of the orbital motion or curvilinear translation of the platens at each station. This frequency may be varied between substantially 75 and 600 r.p.m.'s.

(2) The lineal advance of the glass ribbon. This may be varied from between 0 and 300 inches per minute.

(3) The magnitude of the orbital motion or curvilinear translation of the platens at each station. This may be varied from substantially between 0 to 4 inches (diameter) for each individual platen independent of any other platen. Normally opposed platens at one station "A" or "B" will have the same magnitude of orbit but if desired they may have different orbital magnitudes. Likewise, the platens at adjacent stations "A" and "B" normally have the same magnitude of orbit, however, they may have different orbital magnitudes, the variation being determined, for example, according to the grade of glass finish desired.

(4) The load pressure of each platen on the glass ribbon, i.e. the contact or load pressure developed between the felt and the glass. This may be varied between substantially 0 and 4 p.s.i.

Four variables are thus present; namely (1) the frequency of the orbital motion of platens at each station may be varied between 75 and 600 r.p.m., (2) the lineal advance of the glass may be varied from 0 to 300 inches per minute, (3) the magnitude of the orbit may be varied from 0 to 4 inches, and (4) a variable load pressure selectable between 0 to 4 p.s.i. The combination of the lineal advance of the ribbon of glass and the orbital motion of each platen will generate a polishing curve upon the surface of the glass which is cycloidal. It is evident therefore that the first three variables will each directly modify the polishing curve in a particular manner and that in combination these variables permit many minute variations in the character of the final polishing curve within a wide range. It is believed that the range specified above for each variable is sufficiently comprehensive for all foreseeable glass polishing requirements and each is primarily cited as an example, which is not to be construed as limiting the scope of the invention.

Generally speaking, the magnitude of the orbital motion and the load pressure determine the maximum work done by the polishing platen and are basically considered to be a function of the power of the machine. Thus, it might be said that if the first three variables above listed were established and remained constant, the maximum work of the platen could be varied, due to specific conditions and desirable polishing finish characteristics required, by control over the load pressure. One example of this would be varying the load pressure according to the different polishing mediums used with the platens. This would follow because different polishing mediums would develop different coefficients of friction between the glass and felt thereby effecting the drag of the platen across the glass and also the glass finish. The greater the coefficient of friction, the less power needed and hence a reduction in the load pressure would be needed. Should the coefficient of friction be reduced, it would be possible to increase the power by increasing the load pressure. Thus it could be said that variations of the load pressure would be the best way of varying the power put into the machine.

Figure 7:
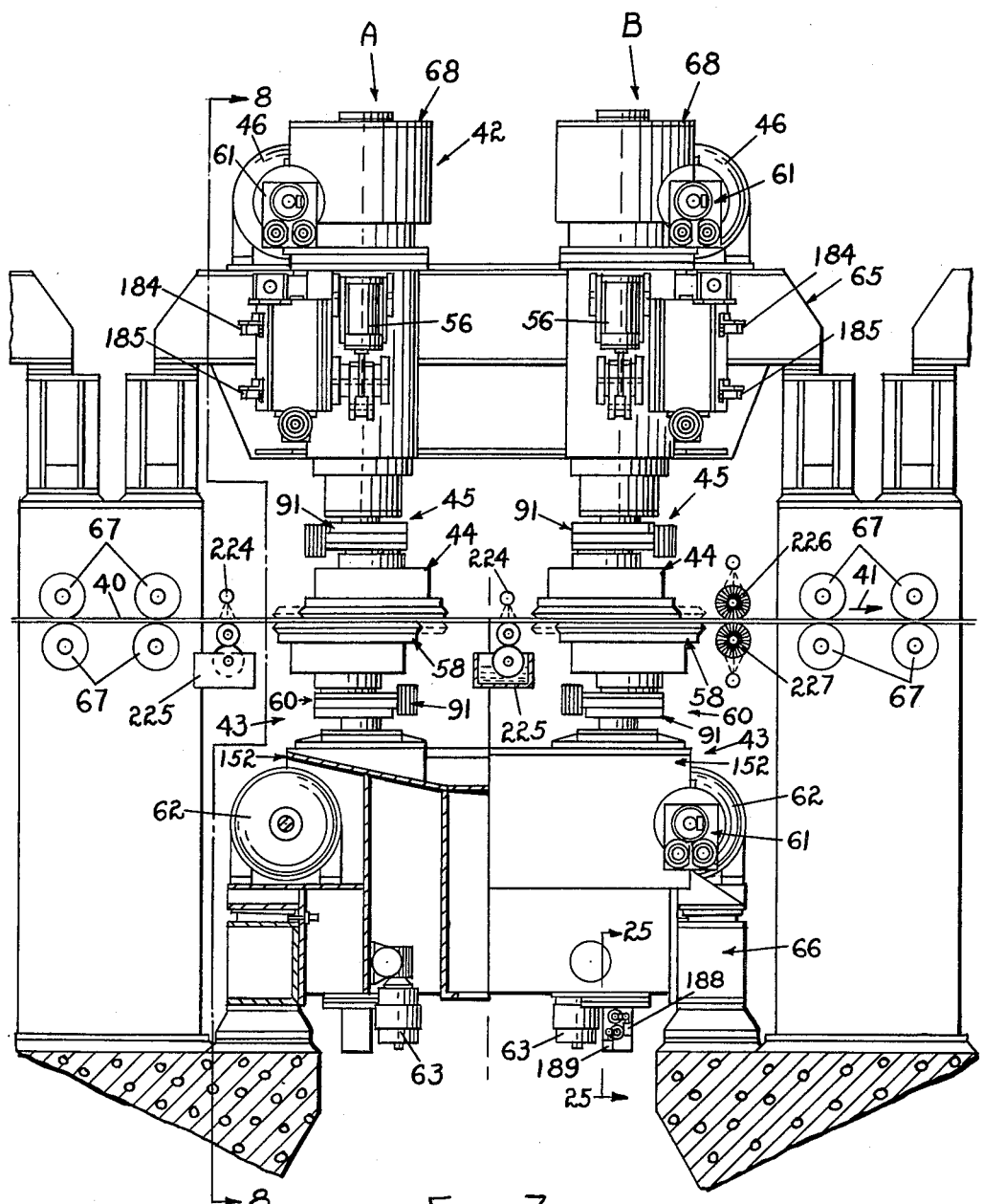
FIG. 7 is a side elevation of the apparatus as viewed from the right of FIG. 6.

In general summary as shown in FIGS. 7 and 8, the stations "A" and "B" are supported in pairs with the upper surface polishing apparatus 42 supported on a framework 65 and the lower surface polishing apparatus 43 supported on a framework 66. The framework 65 is provided with a plurality of motor driven pinch rolls 67 transversely contacting the upper and lower surfaces of the ribbon of glass between each pair of stations "A" and "B" to advance the ribbon in the direction of the arrow 41.

*Drive for Upper Polishing Heads*

The upper surface polishing apparatus 42 is supported on the framework 65 and includes a pair of polished heads 68 suspended in spaced relation inside the opposed edges of the ribbon of glass 40.

Figure 9:
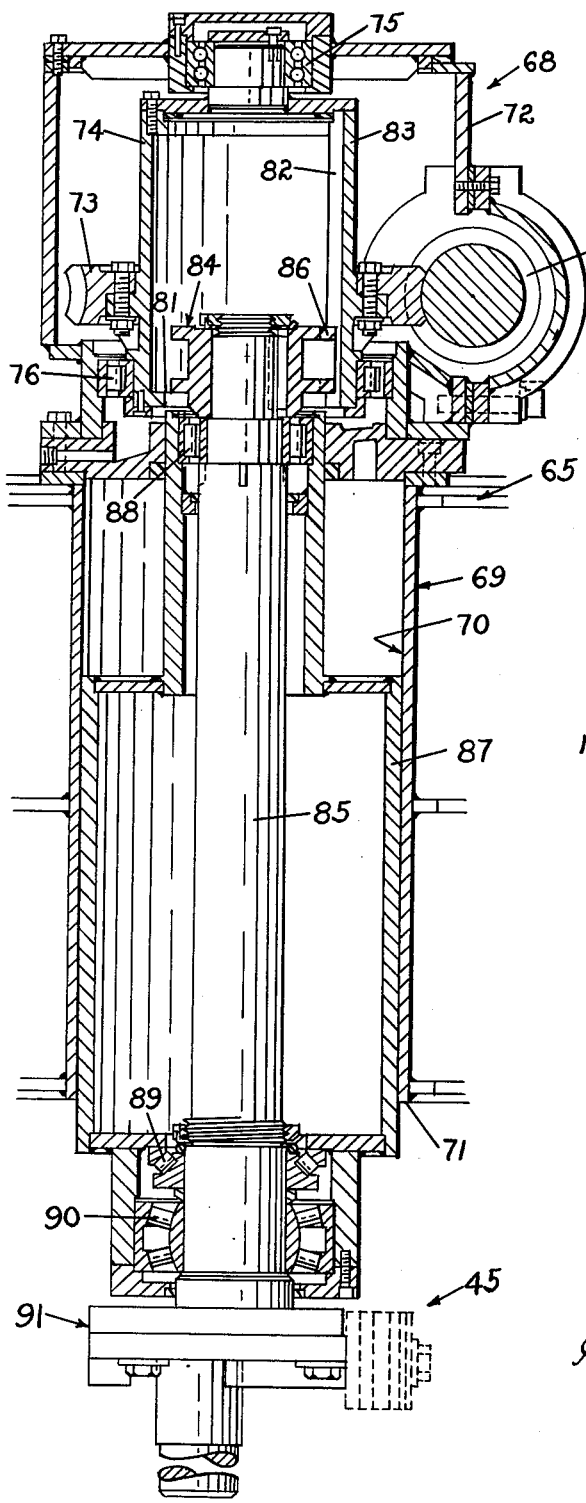
FIG. 9 is a vertical cross-section of an upper platen support head taken on the line 9—9 of FIG. 6 showing the telescoping cylinder and the platen drive mechanism.

The construction of the telescopic drive mechanism of each upper head is shown in detail in FIG. 9. A cylinder 69, having bore 70 open at the bottom end 71 and closed at the top end by a gear case 72, is supported by the framework 65. A worm gear 73 is mounted on a hollow spindle 74 which in turn is supported within the gear case 72 by bearings 75 and 76 for rotation on the extended centerline of the bore 70. A worm 77 is in engagement with the worm gear 73 and is fastened to a shaft 78 (FIG. 8) which projects inwardly through the gear case 72 to connect with the shaft 79 of the double-ended drive motor 46 through a flexible coupling 80. As is clearly shown in FIGS. 1, 6 and 8, the motor 46 is double-ended and is connected as described above to drive two upper polishing heads 68 which are connected to a single polishing platen 44 in a manner to be disclosed hereinafter. The worm gear spindle 74 is provided with a circular opening 81 in its base and a vertically extending groove 82 cut into the inner surface of the wall 83 of the spindle 74. A coupling 84 is keyed to a shaft 85 and the coupling is provided with a projection 86 for vertical movement in the groove 82. A sleeve 87 is supported on the shaft 85 for vertical movement in the bore 70 and is provided with bearings 88, 89 and 90 to support the shaft 85 for rotation within the sleeve and to absorb the thrust. An eccentric, generally indicated by the numeral 91, depends from the lower end of the shaft 85 and will be described in detail hereinafter.

Thus, regardless of the elevation of the eccentric drive mechanism 45, each of the shafts 85 of the two upper surface polishing apparatus 42 is engaged for rotation at identical speeds and direction by the drive motor 46 within the range of 75 to 600 r.p.m.

*Elevating Mechanism for Upper Head*

The upper head elevating mechanism is generally indicated by the numeral 50 and although it is closely related to the safety stop mechanism 57 (i.e. some of the parts of each are common to both) the following description is substantially restricted to the elevating mechanism 50.

As described in conjunction with the drive mechanism for the upper heads, the sleeve 87 is mounted for vertical movement within the cylinder 69 and the shaft 85 carrying the eccentric 91 is rotatably mounted within the sleeve for vertical movement but with the groove 82 and the projection 86 in driving engagement.

Figure 10:
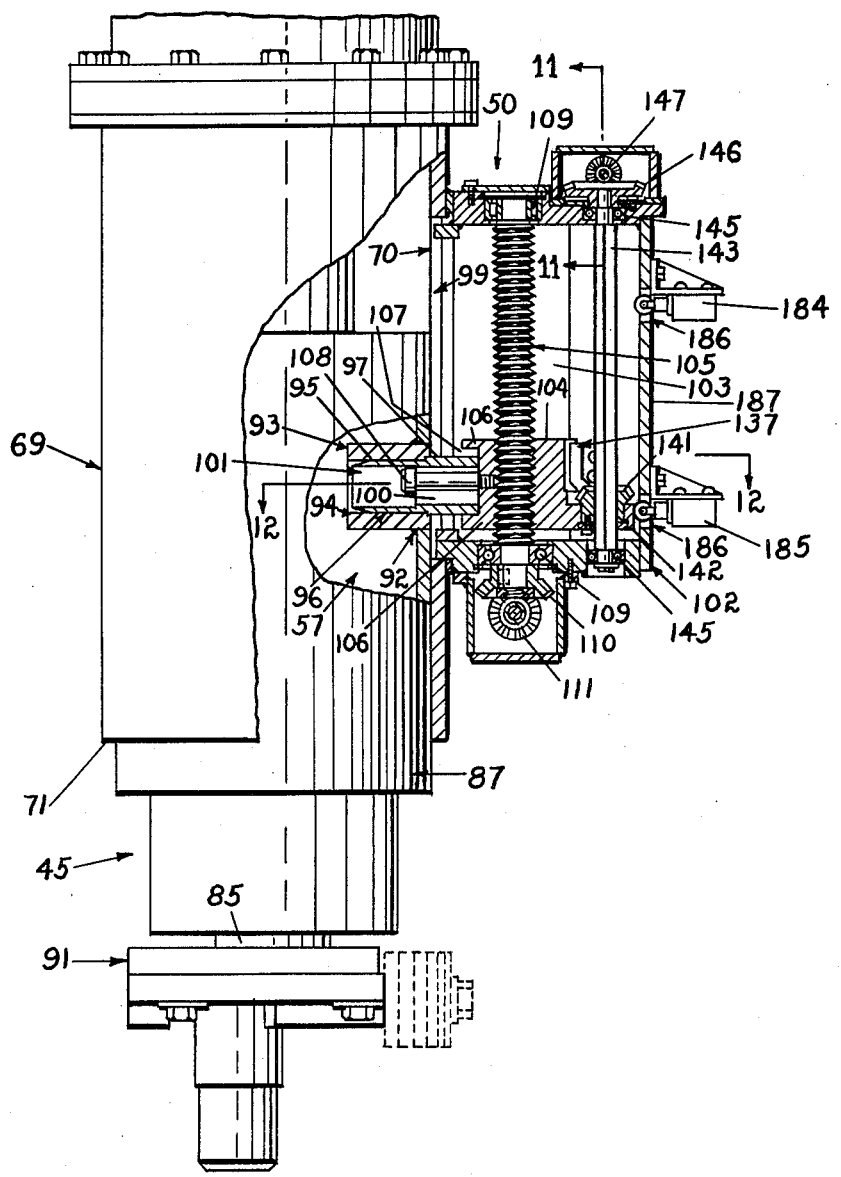
FIG. 10 is a vertical cross-section of an upper platen support head taken on the line 10—10 of FIG. 6 showing the head elevating mechanism, the glass breakage safety stop and a portion of the safety stop clearance indicator mechanism.

Referring particularly to FIGS. 10 and 12, a circular opening 92 penetrates the side wall of the sleeve 87 and an open ended hollow cylinder 93 is piloted or slipped into the opening flush with the outer wall of the sleeve 87 and projecting into the sleeve in a direction normal to the axis of the sleeve for a distance approximating one-half the radius of the sleeve. The bore 94 of the hollow cylinder 93 provides a snug bearing for the cylindrical end 95 of a lift block 96. At the opposite end of the lift block 96 is an enlarged rectangular section 97 terminating in a pair of vertically extending ears 98 (FIG. 12). The enlarged rectangular section 97 of the lift block 96 extends through a vertically extending opening 99 in the side wall of the cylinder 69 thereby providing for vertical movement of the lift block 96 with the sleeve 87. The lift block 96 is also provided with a screw slot 100 (FIG. 13) and a counterbore 101, both elongated in a vertical direction as shown in FIG. 13, for a purpose which will become apparent hereinafter.

A housing 102 is attached by screws to the outer surface of the cylinder 69 in alignment with the lift block 96 and is provided with a pair of ways or guides 103 extending vertically in spaced relation, as illustrated in FIG. 12.

A second lift block 104 is in engagement with a helically threaded shaft 105 and is held against rotation by the ways 103. One end of the second lift block is nested within the ears 98 of the first lift block 96 and is provided with a pair of horizontally extending ears 106 in overlapping relation to the rectangular end section 97 of the first lift block 96. The span between the ears 106 is sufficient to provide a clearance 107, which is best shown in FIG. 14. The reason for providing this clearance will be disclosed in conjunction with the safety stop mechanism 57. A shoulder screw 108 joins the lift blocks 96 and 104 passing through the slot 100 and counterbore 101 to engage a threaded opening in the lift block 104.

The threaded shaft 105 is mounted for rotation in bearings 109 provided in the top and bottom of the housing 102 and the lower end of the shaft is extended at a reduced diameter to carry a miter gear 110 which is in engagement with another miter gear 111. The miter gear 111 is in turn fastened to a shaft 112 which is joined to one of the output shafts 113 of the double-ended motor 49 by suitable couplings 114, as shown in FIGS. 1 and 8. FIGS. 1 and 8 also show an extension of the shaft 112 at one end for engagement by a crank 51 to raise and lower the pair of eccentric drive mechanisms 45 comprising a polishing station.

Attention is again directed to the characteristics of the motor 49, namely, it is a two-speed reversible motor adapted to lower the platen 44 at the slower speed and to raise the platen 44 at a higher speed.

Rotation of the motor 49 in either direction imparts a rotary motion to the shaft 105 (FIGS. 1 through 5 and 10) which moves the lift block 104 in a vertical direction carrying the shaft 85 with it. Rotation of the motor 49 in one direction, lowers the shaft 85 at a slow rate within the limits defined by FIGS. 2 and 3. Further descent is accomplished by rotating the crank 51. Rotation of the motor 49 in the opposite direction, raises the shaft 85 at a faster rate from the FIG. 4 position to the FIG. 2 position.

*Apparatus for Regulating Polishing Pressure*

The apparatus for regulating polishing pressure, generally indicated by the numeral 53 in FIGS. 1 through 7 and 16, is pneumatic and is designed to independently support the weight of the upper surface polishing apparatus 42 and to provide a polishing pressure upon the top surface of the glass ribbon 40.

Figure 16:
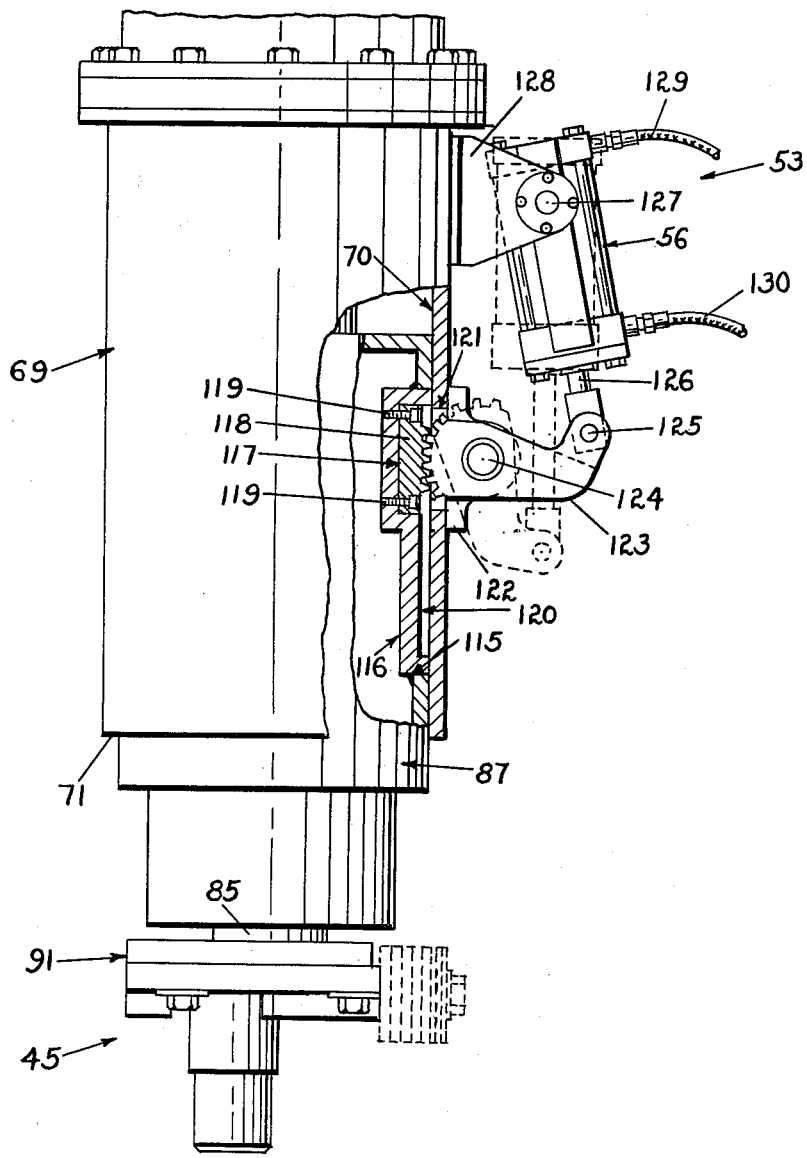
FIG. 16 is an elevation with parts in section taken substantially on the line 16—16 of FIG. 6 showing the pneumatic apparatus for supporting the weight of the upper platen and applying a metered pressure to the upper surface of the glass.

Referring to FIG. 16 in particular, a vertically extending slot 115 penetrates the side wall of the sleeve 87 and receives an insert 116 which is provided with a seat 117 for a gear rack 118. The teeth of the gear rack extend horizontally, flush with or slightly inside the outside diameter of the sleeve 87. Screws 119 retain the gear rack 118 in the seat 117. Another recess 120 is provided in the outer face of the insert 116 and extends downwardly from the bottom of the gear rack 118 for a distance slightly greater than the vertical travel of the sleeve 87. A rectangular opening 121 extends through the wall of the cylinder 69 at a point in alignment with the gear rack 118 when the sleeve 87 is at and near its lowermost position. A pair of brackets 122 are attached with screws to the outer surface of the cylinder 69, one on either side of the opening 121, to support a gear segment 123 on a pivot 124 with the teeth of the segment pivotable into and out of engagement with the teeth of the gear rack 118. The end of the gear segment 123 opposite the teeth is pivotably fastened by a pin 125 to the piston rod 126 of the double-acting pneumatic cylinder 56. The cylinder 56 is in turn pivoted on trunnions 127 projecting from the pneumatic cylinder 56 adjacent the top thereof and fastened to the outer surface of the cylinder 69 by means of a bifurcated bracket 128 positioned vertically above the gear segment 123. A flexible hose 129 admits air from a manually controlled source 54 to the top of the cylinder 56 and a second flexible hose 130 from a second manually controlled source 55 admits air to the bottom of the cylinder.

Referring, in addition to FIG. 16, to FIGS. 2 through 6, each pair of hoses 129 at a polishing station are attached to a header 131 (FIG. 6) to which pressure is applied from the manually activated pneumatic balancing apparatus 54. As is shown in FIG. 16, the gear segment 123 provides a 2 to 1 mechanical advantage which reduces the pressure requirements in the cylinder 56 for balancing the weight of the upper platen 44 and the unsupported portion of the eccentric drive mechanisms 45. When the platen 44 is in the raised position of FIG. 2, a relatively small pressure is exerted on the top of the piston in the cylinder 56 to maintain the piston rod 126 in the extended dashed line position shown in FIG. 16 so that the gear segment 123 will be in position to engage the rack 118 upon lowering of the platen 44.

In the same figures, each pair of hoses 130 at a polishing station are attached to a header 132 (FIG. 6) to which pressure is applied from the manually activated pneumatic apparatus 55.

Figures 2, 3:
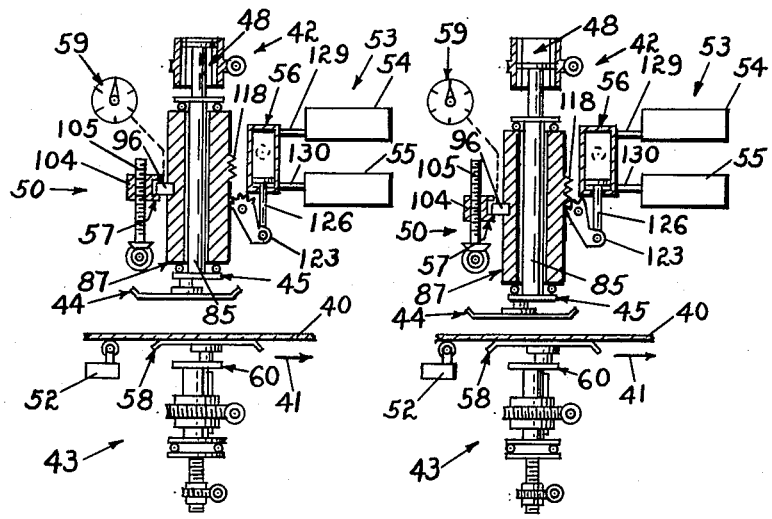
FIGS. 2, 3, 4 and 5 are schematic side elevations progressively illustrating lowering of the upper polishing platen from its maximum raised position to its polishing position.

Thus, in the positions shown in FIGS. 2, 3 and 4 the weight of the platen 44 and the eccentric drive mechanisms 45 are supported by the lift mechanism 50. However, as pressure (approximately 56 p.s.i.g.) is applied to the cylinder 56 above the piston, the weight is supported by the pneumatic apparatus 53, and, as illustrated in FIG. 5 and at an enlarged scale in FIG. 14, the relative position of the lift blocks 96 and 104 has shifted so that the clearance 107 which had previously been at the top is now at the bottom, as is shown in dashed lines. This pressure is referred to as "weigh pressure."

Thereafter air is admitted to the lower portion of the cylinder 56 below the piston to direct a downward force on the shaft 85, applying a polishing pressure to the glass 40. This pressure is referred to as "load pressure," and when referenced to the area of felt on the platens will be in the range of 0 to 4 p.s.i. In other words "load pressure" is the amount of air pressure required to subject each square inch of felt, in contact with ribbon, to a pressure within the range of 0 to 4 pounds. This figure designates the contact or load pressure between the felt and the glass so that by analogy it could be said that the ribbon would be pinched between the upper and lower platens. The application of this "load pressure" will tend to return lift block 96 to its original position with respect to lift block 104 (FIG. 14) before application of the "weighing pressure." With proper location of the safety stop apparatus, to be explained in detail later, a controlled amount of clearance will be indicated on clearance dial 59 and thus dial 59 will show the distance a platen 44 would drop in case glass ribbon 40 breaks.

*Safety Stop Apparatus and Clearance Indicator*

The elements of the safety stop apparatus 57 also are a part of the lift mechanism 50. In operation as the upper platen 44 is lowered by motor 49 from a position shown in FIG. 2 and FIG. 3 (re-engagement of the pneumatic system 53) and to a position approximately 1 inch above the top surface of the glass ribbon 40. At this point limit switch 185 opens the motor lowering circuit by contact with lift block 104, and the foregoing "weigh pressure" is applied to cylinder 56. To lower upper platen 44 the remaining 1 inch to contact glass ribbon 40, hand crank 51 (FIG. 1) must be used. Rotation of this hand crank in proper direction will lower lift block 104 on which lift block 96 is bearing. As the felt attached to the ribbon platen contacts the glass ribbon, the platen 44 comes into physical rest upon the ribbon 40, the ribbon 40 itself being supported by the lower platens. Therefore, further downward travel of spindle 85 and lift block 96 is prevented. At this point additional rotation of hand crank 51 will lower the lift block 104 with respect to lift block 96. Once the lift block 104 is properly positioned with respect to lift block 96 to gain the proper clearance then the proper load pressure, as aforedefined may be applied.

It is obvious that breakage of the ribbon of glass 40 poses a serious problem in that the upper platen must be stopped short of contact with the lower platen 58 to prevent damage to the platens. Therefore, the clearance 107 is initially set, by proper regulation of lift block 104, with respect to lift block 96 so that the dashed line clearance 107 is appreciably less than the thickness of the ribbon of glass 40. Periodic adjustments of this clearance relationship must be made to compensate for reduced thickness of the platen 44 due to wear.

Since it is not feasible to measure the clearance 107 at a plurality of stations and at points positioned on both sides of a rather long machine, a clearance indicator 59 with two pointers has been provided on one side of the machine at each station to indicate the clearance on opposite sides of the apparatus.

Referring to FIGS. 12 and 14, gear teeth 133 are cut into the outer face of one of the ears 98 on the lift block 96 at an angle which intersects an extension of the centerline passing through the drive shaft 85 and the elevator mechanism shaft 105 within the housing 102, as is particularly shown in FIG. 12. A pinion 134 engages the gear teeth 133 and has a shank portion 135 extending through a bearing 136 machined through the lift block 104 at the angle prescribed above. A segment of a miter gear 137 is secured to the terminal end of the shank portion 135 of the pinion 134.

Referring to FIG. 15 in addition to FIGS. 12 and 14, a slot 138, formed radially from the longitudinal centerline of the pinion 134, permits passage of a shoulder screw 139 for entry into a tapped hole 140 in the lift block 104 below the pinion 134 and in vertical alignment therewith. The miter gear segment 137 is in mesh with a miter gear 141 which is rotatably mounted in an extension 142 of the lift block 104. A square shaft 143 passes vertically through a square hole 144 in the miter gear 141 and is pivotably mounted at either end in bearings 145 retained by the housing 102. The square shaft 143 carries a miter gear 146 at its upper end which meshes with a mating gear 147, as shown in FIGS. 10 and 11.

Figure 11:
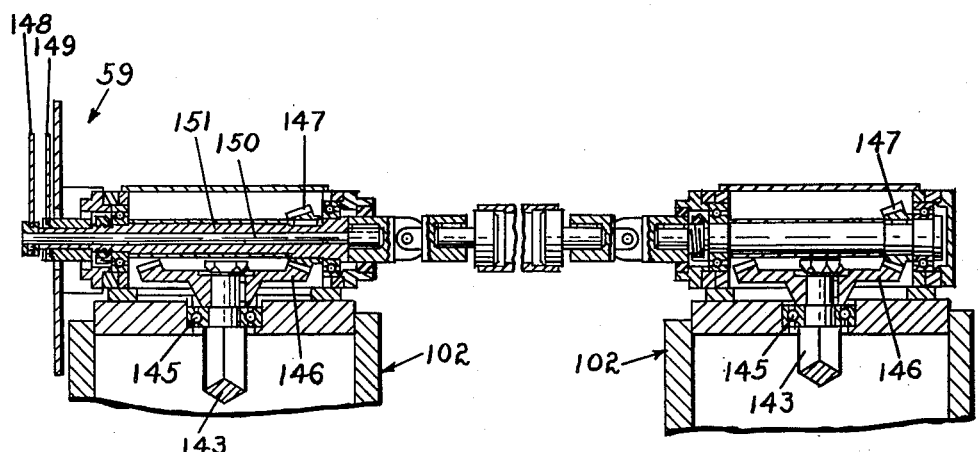
FIG. 11 is a section taken on the line 11—11 of FIG. 10 showing the telescopic shaft arrangement for the safety stop clearance indicator.

As is clearly shown in FIG. 11, each of the square shafts 143 is respectively connected to move one of two pointers 148 and 149 of the indicator 59. The pointer 148 is connected through the shaft 150 to the shaft 143 which is to the right of FIG. 11 through the miter gears 147 and 146 whereas the pointer 149 is connected by means of the shaft 151 to the shaft 143 to the left of FIG. 11 through the miter gears 147 and 146.

Each of the pointers 148 and 149 indicate the relative position of the lift blocks 96 and 104 at one station on opposite sides of the platen, or the maximum amount the upper platen 44 will drop upon breakage of the ribbon of glass 40. By adjusting the safety stop apparatus the dashed line clearance 107, shown in FIG. 14, is appreciably less than the thickness of the ribbon of glass. Also, as previously disclosed, periodic adjustments are required at each station to compensate for wear of the upper platen polishing surface.

Drive for Lower Polishing Heads

The lower platen 58, at each station, is supported on the framework 66 and driven by a pair of heads 152 positioned vertically beneath the upper polishing heads 68, as shown in FIGS. 7 and 8.

A vertical section, taken through a lower polishing head 152, is shown in detail in FIGS. 17 through 19 and includes a gear case 153 mounting a worm gear 154 for rotation in bearings 155. The worm gear 154 is connected to a shaft 156 extending vertically therethrough by a pair of diametrically opposed keys 157 projecting into the bore 158 of the worm gear to engage longitudinally extending slots 159 in the shaft 156. The relative length of the keys 157 and the slots 159 provide for vertical displacement of the shaft 156 with respect to the worm gear 154 and the bearings 155 upon raising and lowering of the lower platen drive mechanism in a manner to be disclosed hereinafter.

The upper end of the drive shaft 156 terminates in the lower platen eccentric drive 60 while the lower end penetrates the bottom wall 160 of the gear case 153 to extend into the bore 161 of a smaller gear case 162 welded to the lower face of the bottom wall 160. Bearings 163 and 164 are mounted for vertical movement within the bore 161 and support the lower end of the shaft 156 to form a part of the mechanism for raising and lowering the lower platen 58 in a manner to be disclosed hereinafter.

The worm gear is engaged by a worm 165 which is supported within the gear case 153 by bearings 166, as shown in FIG. 18. Referring to FIGS. 8 and 19, a shaft 167 projects from one end of the worm 165 and is joined to one output shaft 168 of the drive motor 62 by flexible couplings 169. As shown in FIGS. 1 and 8, one motor 62 drives both of the lower polishing heads 152 at each station.

Referring to FIGS. 17 and 19, the gear case 162 is provided with bearings 170 which rotatably support a worm gear 171 which in turn is centrally engaged by a helically threaded shaft 172. The shaft 172 terminates at its upper end in a yoke 173 which is provided with a projection 174 engaging a vertically extending groove 175 in a bore 161 to restrict the movement of the yoke 173 to a vertical direction.

A worm 176 engages the worm gear 171 and is mounted for rotation within the gear case 162 on shaft 177 supported by bearings 178. The shaft 177 extends through one wall of the gear case 162 and is connected to one output shaft 179 of the motor 63 by flexible couplings 180, as shown in FIG. 8. As previously specified, the motor 63 is reversible for raising the lower platen 58 when the motor is operated in one direction and lowering the lower platen 58 when the direction of rotation of the motor 63 is reversed. A rod 181, having a projection 182 extending horizontally from its lower extremity, depends from the lower face of the helically threaded shaft 172 through the bottom wall 183 of the gear case 162, as shown in FIGS. 17 and 25 for a purpose which will be disclosed hereinafter.

Vertical Motion Limit Control for Polishing Platens

As shown in FIGS. 7, 10 and 12, switches 184 and 185 project through openings 186 in the vertically extending side wall 187 of the housing 102 in the path of the extension 142 of the lift block 104 and are electrically connected to the power supply circuit for the two speed reversible motor 49 for raising and lowering the upper platen 44. The switches 184 at one station limit the upward motion and the switches 185 at the same station limit the downward motion of the upper platen 44, by interrupting the power supply to the motor 49 at both limits.

As previously disclosed, the lower limit switches 185 preferably de-energize the power supply circuit to the motor 49 before the upper platen 44 contacts the glass ribbon 40 and the lowering of the upper platen from that point into contact with the glass ribbon is accomplished manually by rotation of the crank 51.

The vertical position of the lower platen 58 is likewise under control of limit switches 188 and 189, shown in FIGS. 17 and 25, which are operated by the projection 182 on the rod 181. The switches 188 and 189 at each station are electrically connected to respectively de-energize the circuit to the motor 63 at the high and low limits of the vertical motion of the lower platen 58.

Eccentrics

The eccentric drive mechanisms 45 and 60 respectively associated with the upper platen 44 and the lower platen 58 are provided with identical eccentrics 91, which are mounted in inverted positions. An eccentric 91 is shown in detail in FIGS. 20 through 24 in the lower platen 58 receiving position. The eccentric 91 includes two rectangular blocks 190 and 191 respectively joined to a shaft 192 for receiving the platen assembly and the drive shaft 85 or 156 of an upper head 68 or a lower head 152, as the case may be. As shown in FIGS. 20 and 21 the shafts 192 and 156 joined respectively to the blocks 190 and 191 are offset in a horizontal plane to provide a crank to secure the aforementioned orbital motion. Provision is made for varying the amount of the offset or eccentricity by providing a bedded slide 193 and machine screws 194 extending through elongated clearance slots 195 in the block 190 for engagement with tapped holes 196 in the block 191 and screw 198 to form a vernier adjustment 199. A set screw 200 together with machine screws 194 lock the eccentric in the selected position. A divided clamp 201 projects from the exposed surface of the block 190 and is provided with three set screws 202 spaced at equal intervals for attaching the platen assembly concentric with the shaft 192. Graduated weights 203, shown in dashed lines in FIGS. 20 and 21 are attached by screws 204 to the block 190 to counterbalance the centrifugal force of platen, and varied with offset of eccentric.

Change in offset or eccentricity is accomplished by changing the amount or number of spacers 204'. These spacers are of various thicknesses and proper selection and installation will estabish the relative offset of shaft 192 with respect to rotating drive shaft 85 or 156. The screws 197 are to support spacers 204' while adjustment of offset is being made.

Platen Assembly

The upper and lower platen assemblies have been generally indicated by the numerals 44 and 58 to distinguish therebetween. However, for all practical purposes they may be considered identical in construction. The only difference in construction are engineering changes required to resist the direction of thrust occasioned by the inversion of the platen assembly when mounted in one position as related to the platen mounted in the other position.

FIGS. 26 through 28 show the platen in its upper mounting position and therefore is indicated by the numeral 44. In addition FIG. 27 indicates the relative positions of the upper platen assembly 44 and the lower platen assembly 58 respectively in polishing contact with the upper and lower surfaces of the ribbon of glass 40.

As shown in FIG. 26, the platen 44 is comprised of identical half-sections, turned end for end, and for convenience and clarity are respectively indicated by the numerals 205 and 206, each provided with a bearing cage 207 on the longitudinal centerline of the half-sections 205 and 206 adjacent the outer extremity thereof and in vertical alignment with the drive shaft 85 of the upper eccentric drive 45 or, for the lower platen, the drive shaft 156 of the lower eccentric drive 60.

A groove 208 extends around the circumference of the exposed end of the bearing cage 207 and nests within the clamp 201 of the eccentric 91 for engagement thereto by the set screws 202.

Each half-section 205 or 206 of a platen assembly is provided with a base plate 209 in the form of a trapezoid wherein the inner adjacent edges of complementary half-sections progress diagonally in parallel relation to join the parallel sides of the trapezoid with a gap 210 therebetween as shown in FIG. 26. A ribbed superstructure 211 is welded to the surface of one base plate 209 of section 205 opposite the glass ribbon 40 to stiffen the base plate and is extended over the base plate 209 of the complementary half-section to form a slide 212 confining the adjacent section 206 for longitudinal movement only, in a way 213. This movement is limited by a motion compensating type connection 214 comprised of a pair of bearing blocks 215 extending transversely of the slide 212 in spaced relation to the terminus of the slide and to each other. Each of the bearing blocks is provided with a horizontal slot extending through the block in vertical alignment with the slot in the other block. A shouldered spacer 217 is retained within each slot 216 by a screw 218 which engages a threaded opening 219 in the superstructure 211 of the complementary half-section of the platen.

A second plate 220 is removably attached to the exposed surface of the base plate 209 by clamps 221 and is beveled as indicated by the numeral 222 on the side of the glass ribbon 40 on all sides except the diagonal side. The exposed surface of the second plate 220, including the bevels 222, is covered by a polishing pad 223 having a working face in engagement with the glass made of felt or other suitable material. Thus, it is evident that the polishing pads may be replaced without removing the platens.

The primary reason for splitting our platen assemblies 44 and 58, as aforedescribed in detail, is because the bearing center distances as related to the drive shafts 85 of the drive mechanisms must remain coincident during operation. It follows that during continuous operation there will be a greater temperature rise in the platens themselves than in the associated driving mechanisms. The expansion of the platens there resulting will change the center distance of bearing mountings with regard to the drive shafts of the platens so that it is necessary to overcome this by splitting the platen assembly. Therefore this split assembly will overcome or compensate for platen expansion due to the temperature rise therein and the resulting non-coincident bearing center distances as related to the drive shafts 85 of the drive mechanisms.

As mentioned before, our invention is particularly concerned with a matter of balancing all of the forces applied to the glass. Therefore it follows that if the expansion as aforediscussed were not compensated for, we would overload the drive mechanism and such overloading is obviously highly undesirable.

In addition to the above reason we have found that the split platens is necessary because of our particular mode of balancing the total centrifugal forces developed by the platens. In this regard one-half of this total centrifugal force developed by each platen is balanced by counterweights 203 at each drive shaft. In order to insure uniformly distributed motion at each drive shaft 85 we must lock the platen bearing cage 207 with respect to each split platen 205, 206. Now by splitting each platen we insure proper force transmission to the platen so that the centrifugal balancing counterweight 203 at one shaft 85 need only balance its respective half of the platen centrifugal forces and will not be effected by the balancing counterweights effecting the centrifugal forces developed at the other drive shaft.

Miscellaneous Apparatus and Controls

As disclosed in the general description above the drive motors 46 and 62, respectively motivating the upper and lower platens 44 and 58 at each station, are synchronized by selsyn controls indicated by the numerals 61 in FIGS. 6, 7 and 8.

Also, as shown in FIG. 6, a selsyn control 64 is provided for synchronizing the drive motors at adjacent stations when so desired.

As indicated in FIG. 7, a polishing agent, such as for example, rouge, is respectively applied to the upper and lower surfaces of the glass ribbon 40 by means of applicators 224 and 225. Also apparatus 226 and 227 may be provided at desired intervals to wash both surfaces of the glass 40 as it progresses through successive polishing stations.

Summation of Operation

A ribbon of glass 40 is fed into the first of a plurality of stations by the nip rolls 67 and supported at the elevation of the nip rolls upon the felt surface of the lower platen 58 as shown in FIG. 2. The upper platen is then lowered from the position of FIG. 2 of the FIG. 3 position by the motor 49 to a point where the felt polishing surface of the upper platen 44 is approximately 1 inch above the glass ribbon 40.

The upper and lower platen drive motors 46 and 62 are then energized in the order given and when they reach the selected operating speeds are automatically synchronized by the selsyn control 61 with the upper and lower eccentrics inscribing orbits 180° out of phase relation, as illustrated in FIGS. 1 through 5.

As shown in FIGS. 3 and 4, as the sleeve 87 descended, the gear rack 118 moved into engagement with the gear segment 123. Air pressure is now admitted to the upper portion of the two cylinders 56 at each station, above the piston, to exert a lifting force upon the gear segment slightly in excess of the pressure required to balance the weight of the upper platen 44 and associated drive mechanisms 45 not otherwise supported on the frame work 65. This pressure may be referred to as "weigh pressure." The balancing of the weight is shown by the indicator 59 moving from its zero or first position (FIGS. 3 and 4) to a second position in which it reflects the maximum of the dashed line clearance 107 shown in FIG. 14. This second position would in fact be greater than the actual position of the indicator 59 as seen in FIG. 5 (i.e. at its polishing position) since as aforementioned this second position represents maximum clearance between blocks 96 and 104. In any event the indicator position reflects the distance the platen 44 could drop if all support therefore was removed. It will be noted that as the sleeve moves upwardly the weight of the upper platen 44 has been transferred from the elevating mechanism 50 to the pneumatic apparatus 53. A reduction of this "weigh pressure" will return indicator 59 to its zero position and insures positive downward movement of the platen 44 when it is lowered by hand crank 51. Before applying the load pressure, the weigh pressure is reduced slightly, i.e. about 5%, so that lift block 96 returns to its original position resting on block 104 (i.e. indicator 59 reflects maximum clearance) but with much less load being carried by block 104. At this time the upper platen 44 is lowered by rotation of the crank 51 into contact with the glass ribbon 40, however, a portion of the weight of the platen 44, and associated drive mechanism, is supported by the elevated mechanism 50, i.e. by block 104. As contact is made between the upper platen and the glass ribbon, indicator 59 moves from its zero position. Now as additional rotation of the hand crank 51 is made, the block 104 is lowered and the clearance 107 is increased to finally achieve a reading on the indicator reflecting the fact that clearance 107 has a thickness or depth less than the thickness of the glass ribbon.

Thereafter, the upper platen 44 is lowered by rotation of the crank 51 into contact with the glass ribbon 40 but with a portion of the weight of the platen and associated drive mechanism supported by the elevating mechanism 50 (i.e. on block 104). As contact is made between upper platen 44 and glass ribbon 40 indicator 59 will move from its zero position. Additional rotation of hand crank 51 will increase this clearance by lowering block 104 and achieves a reading on the indicator which is less than the thickness of the glass ribbon. Thereafter, controlled air pressure is applied to the cylinder 56 below the piston to exert a downwardly directed force upon the upper platen. This is referred to as "load pressure."

As previously disclosed, the elevation of the lower platen 58 at each station must be corrected periodically to compensate for wear of the polishing pad. Indication of the elevation of the lower platen 58 is by a bench mark on the framework of the apparatus at each station. Also, the dashed line clearance 107 between the lift blocks 96 and 104 shown in FIG. 14 and the reading on the indicator 59, which is graduated in thousandths of an inch, is maintained well below the thickness of the ribbon of glass 40 to prevent contact between the upper platen 44 and the lower platen 58 upon breakage of the ribbon. Wear of the polishing pad for the upper platen 44 requires periodic manipulation of the hand crank to maintain the clearance 107 within the preferred limits.

A switch 52, or other apparatus, for detecting glass breakage at each station is electrically connected to the elevating motor 49 for that station to raise the upper platen 44 at high speed upon breakage of the glass 40. The switch 52 simultaneously relieves the "load pressure" within the cylinder 56 but does not relieve the "weigh pressure."

Therefore in general summary, variables are present in the apparatus, namely; variations in the lineal advance of the ribbon of glass 40, variations in the frequency of the orbital motion of the platens 44 and 58, variations of the magnitude of the orbit, and variations of the load pressure all as aforedefined.

In actual operation all of these variables are maintained constant at each station, however, variation of one or all between stations is possible. In any event the orbit inscribed by each polishing platen upon the constantly advancing glass ribbon is transformed into a cycloid. Since each of the four variables extends over a wide range, an infinite number of modifications of the resultant cycloidal polishing action is possible thereby providing an apparatus which is readily adaptable to all polishing ranges from coarse to fine.

Further refinement of the polishing action upon the surfaces may be accomplished by the use of different polishing agents at progressive polishing stations.

It is to be understood that the forms of the invention disclosed herein are to be taken as the preferred embodiments thereof, and that various changes in the shape, size and arrangement of parts as well as various procedural changes may be resorted to without departing from the spirit of the invention or the scope of the following claims.

We claim:
1. Glass surfacing apparatus for simultaneously surfacing both surfaces of a continuous glass ribbon including means for conveying said ribbon along a definite path, a surfacing unit composed of at least a pair of generally rectangular opposed surfacing members, upper mounting means to mount one surfacing member in engagement with the top surface of the ribbon with the longitudinal edges of said one surfacing member being disposed substantially normal to the direction of conveyance of said ribbon, lower mounting means to mount the other surfacing member in engagement with the bottom surface of the ribbon with the longitudinal edges of said other surfacing member being disposed substantially normal to the direction of conveyance of said ribbon, each of said surfacing member mounting means including eccentric drive means to impart to said surfacing members a curvilinear translation motion such that the longitudinal edges of the surfacing members remain substantially normal to the direction of conveyance of the glass ribbon at all times, motion control means to maintain one surfacing member 180° out of phase with respect to the other surfacing member motor means to impart motion to each of said surfacing members through said eccentric drive means, and safety means to prevent an upper surfacing member from contacting a lower surfacing member should the glass ribbon break during the surfacing operation.

2. Apparatus as set forth in claim 1, including control means to synchronize the motor means for one of said surfacing members with the drive means of said other surfacing member.

3. Apparatus as set forth in claim 1, wherein said eccentric drive means includes means for varying the magnitude of the curvilinear translation path of said surfacing member.

4. Apparatus as set forth in claim 1, wherein said motor means comprises a variable speed motor to enable varying the frequency of the curvilinear translation motion.

5. Apparatus as set forth in claim 1, including means for controlling the contact forces developed between the glass ribbon and both said upper and said lower surfacing members, said control means including means for balancing the weight of the upper surfacing member and means for applying a positive load pressure to said upper surfacing member.

6. Apparatus as set forth in claim 5, wherein said load pressure is variable between 0 to 4 p.s.i.

7. Apparatus as set forth in claim 1, wherein said safety means includes a visual indicator reflecting the clearance space between the opposed working faces of said surfacing members.

8. Glass surfacing apparatus for simultaneously surfacing both surfaces of a continuous glass ribbon including means for conveying said ribbon along a definite path, a surfacing unit composed of at least a pair of generally rectangular opposed surfacing members, upper mounting means to mount one surfacing member in engagement with the top surface of the ribbon with the longitudinal edges of said one surfacing member being disposed substantially normal to the direction of conveyance of said ribbon, lower mounting means to mount the other surfacing member in engagement with the bottom surface of the ribbon with the longitudinal edges of said other surfacing member being disposed substantially normal to the direction of conveyance of said ribbon, each of said surfacing member mounting means including eccentric drive means to impart to said surfacing members a curvilinear translation motion such that the longitudinal edges of the surfacing members remain substantially normal to the direction of conveyance of the glass ribbon at all times, motion control means to maintain one surfacing member 180° out of phase with respect to the other surfacing member and motor means to impart motion to each of said surfacing members through said eccentric drive means, each of said surfacing members including a pair of identical base members and means for joining said pair of base members to each other.

9. Apparatus as set forth in claim 8, wherein said joining means includes a motion compensating means to absorb incidental movement of either base member caused when one of said base members is out of time with the other of said base member.

10. Apparatus as set forth in claim 9, wherein said joining means maintain a gap between the adjacent inner edges of the complementary base members, said inner edges being diagonally parallel with respect to the parallel sides of the trapezoidal base members.

11. Apparatus as set forth in claim 8, wherein each base member is trapezoidal in shape.

12. An apparatus for simultaneously surfacing the opposed surfaces of a continuous glass ribbon moving along a predetermined path including a plurality of spaced adjacent surfacing units each of said units including two generally rectangular, opposed surfacing members, each surfacing member having a surfacing face engaging the glass ribbon with the longitudinal edges thereof being disposed substantially normal to the direction of conveyance of said ribbon, one surfacing member being positioned above the ribbon and one surfacing member being positioned below the ribbon, means for driving each surfacing member so that the surfacing members follow a curvilinear translation motion, means for synchronizing the drive means associated with the upper surfacing member with the drive means associated with the lower surfacing member so that the two surfacing members are 180° out of phase, each of said surfacing members including at least two individual sections, means for connecting the two sections of each surfacing member so that the surfacing member moves as a unitary assembly, said last-mentioned means including means for allowing relative movement of said two individual sections relative to each other while both sections follow the curvilinear translation motion of the surfacing member, said relative movement means allowing movement only along a line transverse with respect to the line of movement of the glass, means for controlling the degree of bearing force applied by each surfacing member on the glass surface opposite thereto, said last-mentioned means including an hydraulic system to balance the weight of at least the upper surfacing member and means for moving both of said upper and said lower surfacing members along a line substantially perpendicular to the continuously moving ribbon of glass, safety means operatively connected to said last-mentioned means to prevent at least the upper surfacing member from falling substantially below the upper surface of the glass ribbon if the ribbon breaks, said last mentioned means also lifting said upper surfacing member along a line perpendicular to the plane of the glass when the glass ribbon breaks, means for controlling the horizontal rate of movement of the glass along its predetermined path, means for controlling the magnitude of the curvilinear translation motion of said upper and said lower surfacing members, means for controlling the speed at which said surfacing members move in their curvilinear translation path and means for leveling the opposite surfacing members so that their surfacing faces are substantially parallel.

13. An apparatus in accordance with claim 12, in which means are provided for synchronizing the movement of the drive means of adjacent pairs of surfacing members so that the motion of the upper surfacing members at adjacent units are additionally operating 180° out of phase.

14. A glass surfacing platen, including a first section and a second section, said second section being similar in size and shape to said first section and complementary thereto, both said first and said second sections including a base plate in the form of a trapezoid, the adjacent edges of the base plates progressing diagonally in spaced parallel relation to join the parallel sides of the base plates to define a gap between said sections, a polishing pad having a working face and means for mounting said polishing pad to said base plates.

15. A glass surfacing platen as defined in claim 14, including a ribbed superstructure mounted to one base plate and to its surface farthest removed from the platen working face, said ribbed superstructure forming a slide way, said slide way extending over the gap between adjacent base plates and over the adjacent base plate and means on said other base plate engaging said slide way allowing longitudinal movement only of said first and said second platen sections with respect to each other.

16. Glass surfacing apparatus for simultaneously surfacing both surfaces of a continuous glass ribbon, including means for conveying said ribbon along a definite path, a surfacing unit composed of a plurality of pairs of generally rectangular, opposed surfacing members, upper mounting means to mount one surfacing member of each pair in engagement with the top surface of the ribbon with the longitudinal edges of said one surfacing member of each pair being disposed substantially normal to the direction of conveyance of said ribbon, lower mounting means to mount the other surfacing member of each pair in engagement with the bottom surface of the ribbon with the longitudinal edges of said other surfacing member of each pair being disposed substantially normal to the direction of conveyance of said ribbon, each of said surfacing member mounting means including eccentric drive means to impart to said surfacing members a curvilinear translation motion such that the longitudinal edges of the surfacing members remain substantially normal to the direction of conveyance of the glass ribbon at all times, motion control means to maintain one surfacing member 180° out of phase with respect to its opposed surfacing member, motor means to impart motion to each of said surfacing members through said eccentric drive means, means for vertically positioning said upper surfacing members with respect to said ribbon, and safety means to prevent an upper surfacing member from contacting a lower surfacing member should the glass ribbon break during the surfacing operation, said safety means constituting a portion of said upper surfacing member vertical positioning means.

17. Apparatus as set forth in claim 16, wherein said upper surfacing member vertical positioning means includes a switch means and a reversible motor, said switch means de-energizing said reversible motor before the upper surfacing member contacts the glass ribbon and a hand crank to lower the upper surfacing member the remaining distance into engagement with the glass ribbon.

18. Apparatus as set forth in claim 16, including vertical positioning means for said lower surfacing member including switch means and a reversible motor, said switch means de-energizing said reversible motor at the upper and lower limits of the vertical motion of said lower surfacing member.

References Cited in the file of this patent
UNITED STATES PATENTS

| | | |
|---|---|---|
| 1,729,498 | Waldron | Sept. 24, 1929 |
| 1,962,766 | Crowley et al. | June 12, 1934 |
| 1,962,767 | Crowley et al. | June 12, 1934 |
| 2,176,481 | Waldron et al. | Oct. 17, 1939 |
| 2,285,318 | Waldron | June 2, 1942 |
| 2,308,976 | Indge | Jan. 19, 1943 |
| 2,417,680 | Decker | Mar. 18, 1947 |
| 2,491,510 | Miller | Dec. 20, 1949 |
| 2,815,612 | Laverdisse | Dec. 10, 1957 |
| 2,859,565 | Javoux | Nov. 11, 1958 |
| 2,867,059 | Charnock | Jan. 6, 1959 |
| 2,875,557 | Heymes | Mar. 3, 1959 |
| 2,882,650 | Price et al. | Apr. 21, 1959 |
| 2,906,066 | Laverdisse | Sept. 29, 1959 |
| 2,909,871 | Heymes et al. | Oct. 27, 1959 |
| 2,910,813 | De Vore | Nov. 3, 1959 |
| 2,935,823 | Heymes | May 10, 1960 |
| 2,936,555 | Junge | May 17, 1960 |
| 2,937,480 | Peyches | May 24, 1960 |